US010810623B2

(12) United States Patent
Kapoor et al.

(10) Patent No.: US 10,810,623 B2
(45) **Date of Patent: *Oct. 20, 2020**

(54) E-COMMERCE MESSAGING USING SMS

(71) Applicant: International Business Machines Corporation, Armonk, NY (US)

(72) Inventors: Rohit V. Kapoor, Richmond Hill (CA); Jimmy W. Lo, Scarborough (CA); Joanna W. Ng, Unionville (CA)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/116,839

(22) Filed: Aug. 29, 2018

(65) Prior Publication Data

US 2019/0034970 A1 Jan. 31, 2019

Related U.S. Application Data

(63) Continuation of application No. 15/093,608, filed on Apr. 7, 2016, now Pat. No. 10,121,166, which is a (Continued)

(30) Foreign Application Priority Data

Oct. 4, 2002 (CA) ...................................... 2406880

(51) Int. Cl.
*G06Q 30/00* (2012.01)
*H04W 4/00* (2018.01)
(Continued)

(52) U.S. Cl.
CPC ......... *G06Q 30/0267* (2013.01); *G06Q 30/02* (2013.01); *G06Q 30/0207* (2013.01); (Continued)

(58) Field of Classification Search
CPC ........... G06Q 30/02; H04W 4/14; H04W 4/12
(Continued)

(56) References Cited

U.S. PATENT DOCUMENTS

| | | | |
|---|---|---|---|
| 5,719,918 | A | 2/1998 | Serbetciouglu et al. |
| 6,125,281 | A | 9/2000 | Wells et al. |

(Continued)

FOREIGN PATENT DOCUMENTS

| | | | |
|---|---|---|---|
| JP | 2003179978 | A | 6/2003 |
| WO | 9842173 | A | 10/1998 |
| WO | 0169436 | A | 9/2001 |

OTHER PUBLICATIONS

IBM: List of IBM Patents or Patent Applications Treated As Related (Appendix P), Mar. 19, 2020, 2 pages.

*Primary Examiner* — Sun M Li
(74) *Attorney, Agent, or Firm* — Alexis N. Hatzis

(57) ABSTRACT

A method for generating an SMS business message for processing by a software application includes: a data collection interface accepting outgoing instructions and outgoing data from said software application; a message encoding engine encoding said outgoing instructions and outgoing data from said software application; using an encoding template to generate the SMS business message as a categorized SMS message formatted for processing by a data processing system; and a dispatcher runtime processor processing said SMS business message for transmission over a network to a recipient.

25 Claims, 21 Drawing Sheets

Related U.S. Application Data continuation of application No. 10/529,988, filed as application No. PCT/GB03/04336 on Oct. 3, 2003, now Pat. No. 9,331,871.

(51) Int. Cl.

| | |
|---|---|
| ***G06Q 30/02*** | (2012.01) |
| ***H04L 12/58*** | (2006.01) |
| ***H04L 29/06*** | (2006.01) |
| ***H04W 4/12*** | (2009.01) |
| ***H04W 4/14*** | (2009.01) |
| *H04L 12/18* | (2006.01) |

(52) U.S. Cl.

CPC ......... *G06Q 30/0241* (2013.01); *H04L 51/04* (2013.01); *H04L 51/38* (2013.01); *H04L 63/0428* (2013.01); *H04W 4/12* (2013.01); *H04W 4/14* (2013.01); *H04L 12/1859* (2013.01); *H04L 51/30* (2013.01); *H04L 2463/102* (2013.01)

(58) Field of Classification Search

USPC .............................. 705/14.4, 14.73; 455/466

See application file for complete search history.

(56) References Cited

U.S. PATENT DOCUMENTS

| | | | | |
|---|---|---|---|---|
| 7,277,717 | B1 | 10/2007 | Hart et al. | |
| 9,331,871 | B2 | 5/2016 | Kapoor et al. | |
| 10,121,166 | B2 | 11/2018 | Kapoor et al. | |
| 2002/0123359 | A1* | 9/2002 | Wei | H04L 29/06 455/466 |
| 2004/0019487 | A1 | 1/2004 | Kleindienst et al. | |
| 2004/0128243 | A1* | 7/2004 | Kavanagh | G06Q 20/04 705/39 |

* cited by examiner

| Short Form | Long Form |
|---|---|
| WES | WebSphere Everyplace Servor |
| RTP | Runtime Processor |
| MEE | Message Encoding Engine |
| MCW | Message Composing Wizard |
| DCI | Data Collection Interface |
| CMS | Common Message Subsystem |
| AC | Application Components |

The Complete eCommerce SMS System

Using SMS message composing wizard to create new SMS type in SMS universal encoding template
Flow chart for new SMS type creation Actual outbound SMS message example SMS inbound message with user response filled in

E-COMMERCE MESSAGING USING SMS

PRIORITY CLAIM AND RELATED APPLICATIONS

This application is a continuation of and claims priority from U.S. patent application Ser. No. 15/093,608, filed Apr. 7, 2016 which is a continuation of and claims priority from U.S. patent application Ser. No. 10/529,988, filed Mar. 31, 2005, which claims priority to Canadian Patent Application No. 2406880, filed Oct. 4, 2002. The content of the above applications are fully incorporated herein by reference.

FIELD OF THE INVENTION

This invention relates to the field of wireless e-commerce communication, and more particularly to methods and apparatus for applying Short Message Services and other messaging services used in mobile wireless communication to commercial messaging.

BACKGROUND

Mobile commerce offers convenience to users such that they can perform business transaction, anytime, anywhere. Though Wireless Application Protocol (WAP) has been around for several years, the market penetration of WAP enabled cell phones, and other such web enabled wireless devices still remains quite low. The most established technology in the space of mobile commerce today is Short Message Services (SMS) on mobile wireless devices. With SMS's high penetration and adoption rate in the market, it has been a prime target for mobile commerce usage.

Examples of SMS notification with commerce functions contemplated by the present invention include the following:

marketing driven message to user: e.g. discount information, promotion and other commerce campaign information;

notification for business events: e.g. order received confirmation, shipping confirmation; and, notification for operational efficiency like payment due, or other deadline driven type reminders.

However, various intrinsic technical hurdles and limitations exist in SMS today, thus making its application and usage in commerce web application difficult and impractical.

There are a number of limitations to prior art technology and a requirement exists for the use of SMS messaging in business environments. A discussion of these limitations and requirements follow.

Limitations of Using SMS in Commerce Transactions

The absence of the concept of semantics in SMS make SMS usage in commerce application difficult. The difficulty lies in:

the encoding of the SMS message to accurately implement a given business purpose; and, the corresponding run time handling of the SMS message as the business purpose requires.

Encoding Barriers

SMS messages, by nature are typeless, stateless, sessionless and meaningless to data processing systems. Currently the main purpose of SMS messaging is person to person communication between mobile devices.

However, for SMS messages to be viable as means of business transactions, SMS cannot be just a casual exchange of two parties. Business transaction requirements include: trace ability, confirmation, and non-repudiation. It also has to be understood by any web application or other data processor that handles it. We collectively define these requirements as the semantics of SMS messaging.

For example:

A given set of business rules may require that a subset of SMS messages be confirmed on delivery for non-repudiation of transactions such as:

i. confirmed arrival ii. recorded timestamp of arrival for non-repudiation iii acknowledgement of reception of SMS messages It may also be a business requirement that a given set of SMS messages are to be regularly delivered based on a given schedule. Examples include:

i. monthly reminders of invoices ii. scheduled promotions via SMS messages

Broadcasting Type SMS messages may be required by businesses to reach multiple users without the need of checking or confirming message arrival. Examples include:

i. Store wide promotional broadcasts.

In this case acknowledgement would likely not be required.

When a user wants to send in a SMS message to make a transaction, the intent of the user (e.g. to buy a given item) as encoded in the SMS message text has to be unambiguously understood by a web application or other application that handles the user's incoming SMS message.

Correctly encoding SMS messages to accurately represent business intent is a technically complex and difficult task and is highly prone to human error. Human errors in encoding are often very expensive and difficult to debug and correct. Business users want efficiency and reliability in using SMS to achieve their business objectives. They require sheltering from such technical complexity when using SMS messages in their business processes. Business users typically only want to focus on:

i. Determining the business intent of a given SMS message;

ii. Forming the correct wording of the message (without worrying about the different technical details of encoding); and, iii. Being informed of error if the message sent does not meet the intent of that message classification.

Business users who initiate these business transactions now face the significant technical challenge of manually encoding all of these SMS messages correctly so that they map accurately to the particular different business objectives that they set out to achieve.

Difficulty in Semantic Handling at Run Time

Apart from the manual, technical challenge in SMS message encoding, semantic handling at run time to meet business process requirements is also a major problem.

For example, a SMS message notifying a user of an outstanding payment typically requires the acknowledgement of the user, as stipulated by a business process that defines "a completed customer touch point".

The lack of acknowledgement by the user upon receiving the SMS message in this case will be handled differently than other SMS message.

However, the concept of semantics and categorization does not presently exist in the space of SMS today.

The Absence of Syntax in SMS Messages makes Its Usage in Commerce Business Processes Difficult and Impractical

Lack of Mapping of SMS Text Stream to a Commerce Business Action

SMS messages are simple text messages without any encoding scheme. Thus, a simple plain text SMS message is unsuitable for commerce transactions for the following reasons in addition to the ones mentioned above:

i. It's not currently possible for a simple SMS message to indicate the type of commerce transaction to be carried out;
ii. Additional parameters required by a particular transaction cannot be encoded in a standard manner and hence, cannot be parsed by the backend commerce application;
iii. Additional details like user authentication and authorization can not be taken care of in a standard manner;
iv. Lack of state information means request-response model required by commerce transactions can not be applied to commerce SMS messages; and,
v. Free form composing of 160 characters as responses by human users makes the adoption impossible and impractical.

The above problem creates a serious usability issue for SMS users (both human and web application) who need to respond to business messages originated from a Web Application or other data processing application.

Lack of Notation for Parameters Encoded as Part of the SMS message

All inbound SMS messages carrying transaction information are required to be validated for data completeness and data validity. Not only that, users sending SMS messages to a given web application are required to encode enough information in the inbound SMS messages for proper authentication.

For example, using SMS in online auction requires that the backend web application used to communicate to bidders notify the subscribed bidders whenever an auction bidder has been outbid by someone else. Bidders, upon notification, should be given a mechanism to respond in order to raise their bids.

In this example, the SMS message is required to be sent in a non-repudiated manner so that the subscribed bidders can't deny receipt of auction override notices. Also such messages must be sent out via a high priority channel, if available, so that they can reach the bidders as soon as possible. In addition, the auction bidders are required to have a mechanism to call back the backend commerce application being used in the auction to submit a new bid using a standard SMS message template acceptable to the backend commerce application. These SMS messages must be parsed correctly by the backend commerce application in order for the backend web application to perform the appropriate semantics.

As an example, one of the required parameters in an auction scenario would be an SKU number for the identification of item under bid. Both back end server and bidder authentication is required for non-repudiation purposes.

The lack of syntax in SMS messaging makes application to the following business processes extremely difficult:

commerce process mapping;
user authentication;
parameter passing;
data validation.

Technical Complexities in encoding SMS deter Business Users from adopting its usage The originators of business SMS messages are business users who have business needs to send business messages. Their prime concern is to focus on the business logistics of the message (like the timing of sending, to whom to send the message to etc.) and the message itself (like the choice of wordings etc.). They do not want to be (and typically cannot afford to be) burdened with the technology of the delivery medium. For example, the technical knowledge of how to send a SMS message is something that the business users do not want to deal with and expect to be handled for them. Transparency and user friendliness is important to a business user.

The Requirement of Confirmation in Commerce Usage

A key requirement of to use SMS in commerce is the need for confirmation from SMS message recipients. The following is a list of examples for such critical requirements in SMS usage in commerce:

Upon receiving a SMS notification from the commerce server, often the recipient needs to respond by sending an SMS message back to the commerce server. For example: the recipient may send an SMS message back to the commerce server to buy an item advertised by an SMS promotion message.

To fulfill the non-repudiation requirement, for example: all customer touch points need to be recorded.

Confirmation also requires the confirmation of user ID in an inbound message.

The Requirement of Security in Commerce Usage

Another key requirement for using SMS in commerce is the need for security in carrying out a business transaction. This requirement includes:

User ID authentication by a web application like WebSphere when a user initiates a transaction using SMS message Web application authentication by the user so that the user knows for sure that the correct Web application is handling the user's request User authentication to confirm that no unauthorized mobile device is used for the transaction; a PIN could preferably be used as an additional layer of user confirmation.

The Requirement of Session in Commerce Usage

Another key requirement of using SMS in commerce is that of the session. Often, when a web application sends out an outbound message to its users (e.g. campaign message like 'all electronics 50% off if purchased in the next 6 hours'), the web application used expects the user to respond back in SMS to the corresponding outbound message within the specified time period. Typically, this requirement of session includes:

A request and response model mapping to outbound and inbound SMS messages;

A time out mechanism; and,

A Session Data sharing mechanism.

One of the major shortcomings of using SMS messages in commerce application is the absence of syntax in SMS message, making its usage in commerce business processes difficult and impractical. Another major shortcoming is the lack of mapping of the SMS text to a predefined commerce business action or task. Often, SMS text maps to the type of commerce transaction to be carried out, usually the commerce business action requires additional parameters. Free form composing of 160 characters by human users makes impractical.

In addition, for SMS to be adopted in commerce application, there is a strong requirement for security mechanisms to provide user authentication; web application identification; receiving confirmation from SMS message recipients; and the ability to associate user responses with the intended commerce events.

SUMMARY OF THE INVENTION

The present invention accordingly provides, in a first aspect, a method for generating an SMS business message for processing by a software application comprising the steps of: a data collection interface accepting outgoing instructions and outgoing data from said software application; a message encoding engine encoding said outgoing instructions and outgoing data from said software application using an encoding template to generate the SMS business message as a categorized SMS message formatted for processing by a data processing system; and a dispatcher runtime processor processing said SMS business message for transmission over a network to a recipient.

The present invention accordingly provides, in a second aspect, a means for generating an SMS business message for processing by a software application comprising: means for a data collection interface accepting outgoing instructions and outgoing data from said software application; means for a message encoding engine encoding said outgoing instructions and outgoing data from said software application using an encoding template to generate the SMS business message as a categorized SMS message formatted for processing by a data processing system; and means for a dispatcher runtime processor processing said SMS business message for transmission over a network to a recipient.

The present invention accordingly provides, in a third aspect, a computer program product directly loadable into the internal memory of a digital computer, comprising software code portions for performing, when said product is run on a computer, the method comprising the steps of: a data collection interface accepting outgoing instructions and outgoing data from said software application; a message encoding engine encoding said outgoing instructions and outgoing data from said software application using an encoding template to generate the SMS business message as a categorized SMS message formatted for processing by a data processing system; and a dispatcher runtime processor processing said SMS business message for transmission over a network to a recipient.

BRIEF DESCRIPTION OF THE DRAWINGS

Preferred Embodiments of the present invention will now be described by way of example, referring to the accompanying drawings in which:

FIG. 9 depicts an SMS Inbound Message with user response filled in;

DETAILED DESCRIPTION OF PREFERRED EMBODIMENTS

Figure 1:
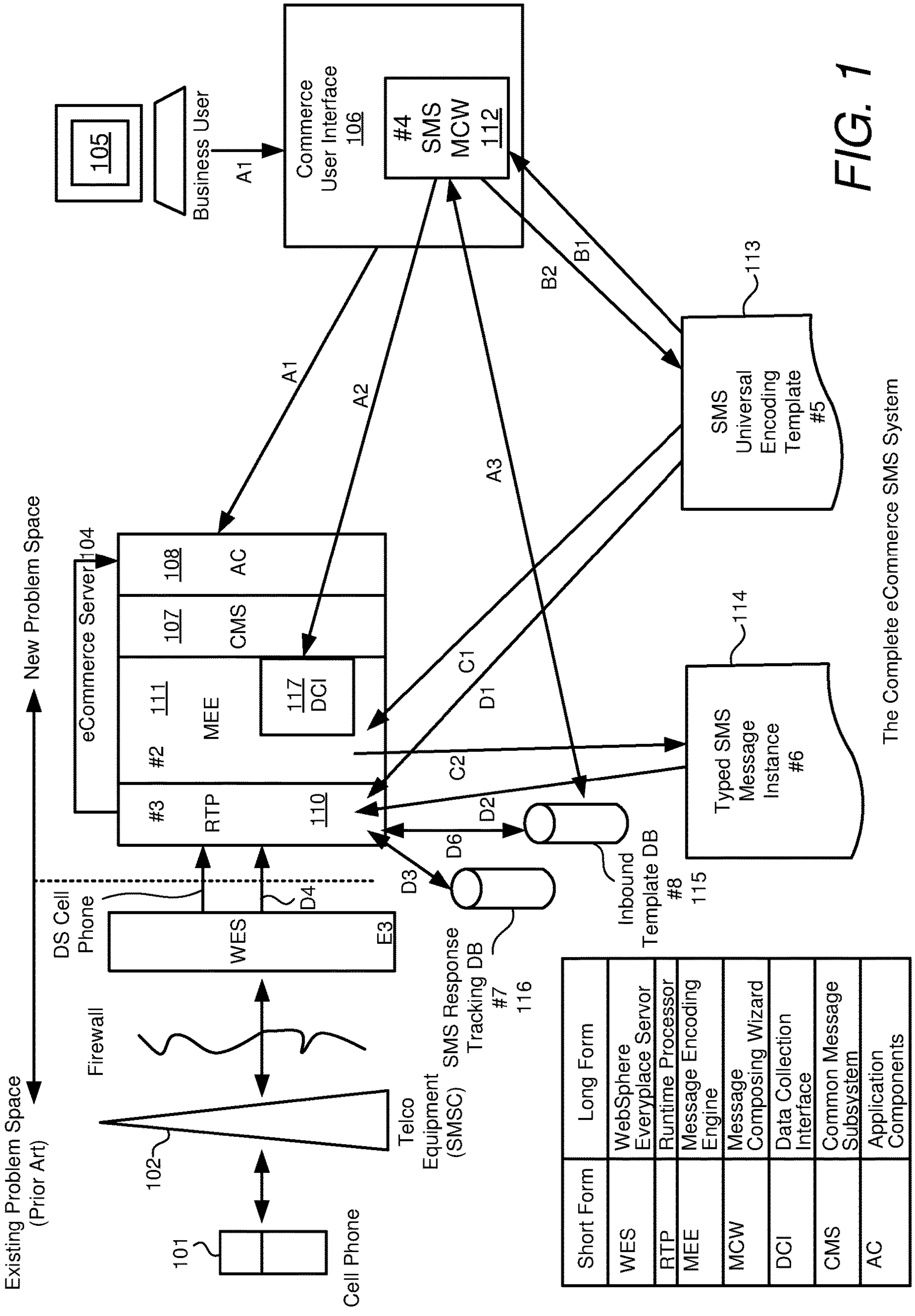
FIG. 1 is a block diagram illustrating a system for performing e-commerce using SMS in an embodiment of the present invention.

FIG. 1 illustrates an SMS enabled e-commerce system highlighting the improvements of a preferred embodiment over pre-existing systems. The improvements contributed by the invention herein are indicated by shading.

As indicated previously SMS is not new. Referring to FIG. 1, which depicts an SMS enabled Commerce communication system in accordance with the preferred embodiment, it can be seen that existing technology lies in space labelled prior art. In the past there were attempts to solve the issue of routing SMS messages to appropriate applications running on the mobile devices (e.g. cell phones).

The space labelled 'New Problem Space' in FIG. 1 is new with the exception of a few basic building blocks that exist today. Although some of the basic building blocks may exist, the preferred embodiments herein allows enhancement of them as appropriate to take into account new capabilities offered by the preferred embodiments. New elements are highlighted in gray while prior art elements are the not highlighted.

Referring to the embodiment illustrated in FIG. 1, it can be seen that e-commerce Server 104 is comprised of a number of components:

Application Components 108: Application components 108 form the business subsystems of a given commerce server. Each business subsystem is an implementation of a given business processes. Examples of business subsystems include: Order Management; User Management; Marketing and Campaign subsystems, among others.

Common Message Subsystem 107: The Common Message Subsystem 107 is a generic message handling system to handle (and process) messages generated by the application components 108. The common message subsystem handles e-mail's, file transport and other matters pertaining to handling and processing messages.

The embodiment illustrated in FIG. 1 makes use of a number of existing features or processes including:

SMS messages: An SMS message is limited to a maximum 160 character long simple text message. It can be sent through many wireless networks. Most cellular phones are capable of sending and receiving SMS messages.

Wireless Message Gateway: A wireless message gateway can be implemented by a computer which can route SMS messages between a wireless network and the e-commerce server 104.

SMS Centre: The SMS Centre 102 is typically operated by the telecommunication company to handle the delivery of SMS messages to selected mobile devices.

Data Collection Interface (#1): The Data Collection Interface 117 is comprised of a set of interfaces that collect i. user input via SMS Message Composing Wizard 112; and, ii. data generated by the Application Components 108 forwarded by the Common Message Subsystem 107 to generate an SMS input data collection to be used by the Message Encoding Engine 111.

Message Encoding Engine (#2): The message encoding engine 111, takes an input data collection, as generated by the Data Collection Interface 117, as input.

The message encoding engine 111 then uses the data in the SMS input data collection to generate the encoding of an SMS message with attributes appropriate to the user selected SMS type. It further validates the user input against the SMS Universal Encoding template 113 for error checking.

This automatic generation capability in the engine 111 eliminates encoding errors, likely due to human mistakes. This also hides the technical complexity of the encoding of attributes for the implementation of message intent from business users. The Message Encoding Engine 111 produces a Typed SMS Message instance 114 as output.

Runtime Processor (#3): The SMS Message Runtime Processor 110 handles business semantics as defined in SMS categorization at run time.

Basic Functions of the run time processor 110:

If an SMS message requires confirmation of delivery, or expected response, the SMS Message Runtime Processor 110 will keep track on the confirmation.

The SMS Runtime Processor 110 is also responsible for taking the response returned from an end user and locating the corresponding inbound message template from the inbound template database 115.

If the SMS message is a scheduled message, the SMS Message Runtime Processor 110 will handle the scheduling of the SMS message sent.

Further semantic action can be taken in the absence of user confirmation.

The runtime processor also does runtime error checking and error handling.

Figure 2:
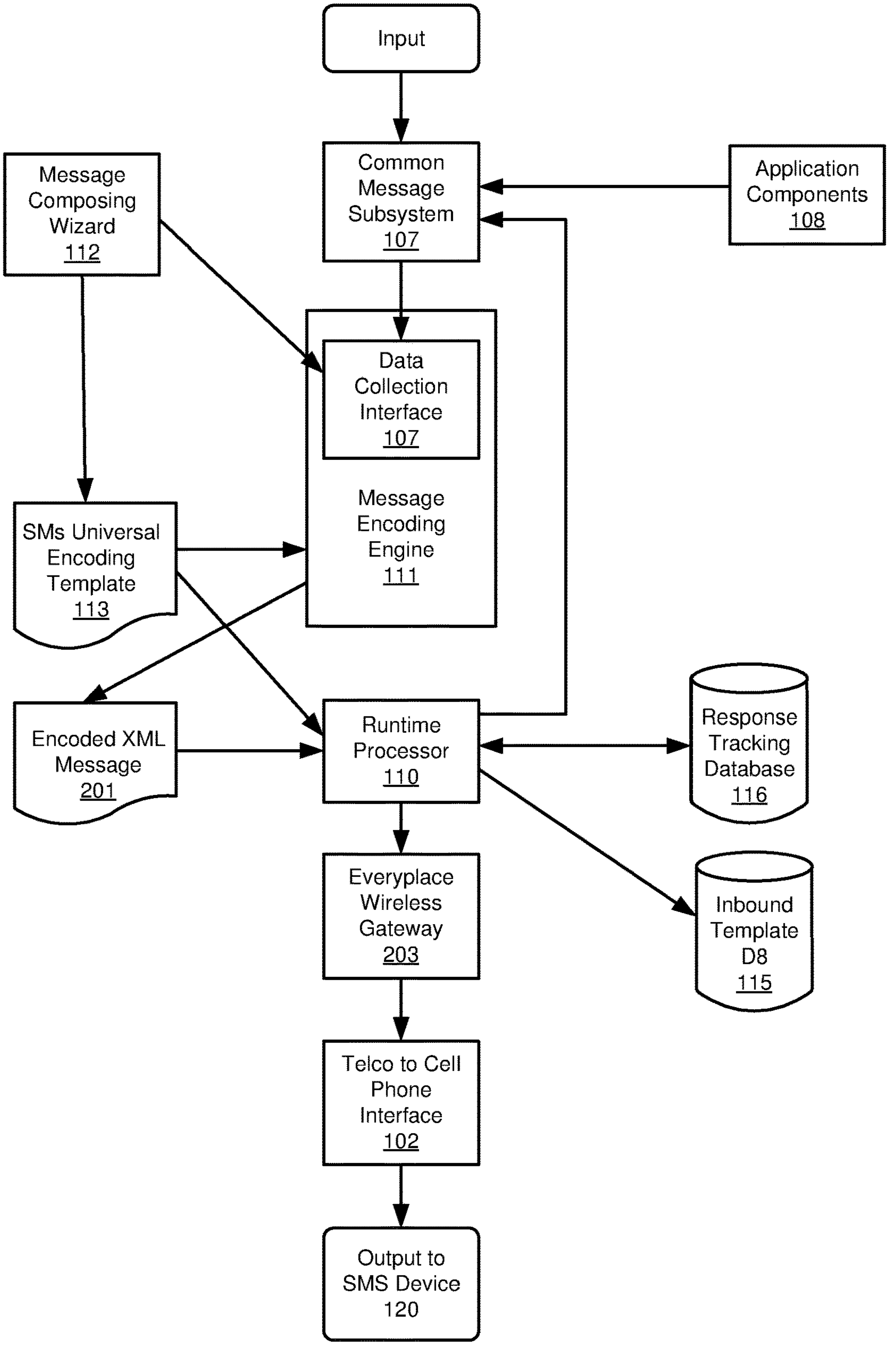
FIG. 2 depicts a Structure Mapping of the SMS commerce Infrastructure Components.

SMS Message Composing Wizard (#4): Referring to FIG. 2 which illustrates the structural mapping of an SMS Commerce Infrastructure system in accordance with an embodiment of the present invention, the SMS Message Composing Wizard 112 guides a user to articulate the intended usage of the message. SMS Message Encoding Engine 111 uses the user input to generate an SMS message by mapping the user input into a selected predefined type in a SMS categorization template 113 as follows:

i. The Message Composing Wizard 112 takes the user input and invokes the Data Collection Interface 117, which in turn produces an appropriate SMS input data collection.

ii. In the event that user has defined a new SMS categorization via the Message Composing Wizard 112, the Message Composing Wizard 112 will then also update the SMS Universal Encoding Template 113.

iii. In the event that the business user defines an SMS message that has the associated required response from the end user, the business user will define the required response as required and understood by the application components 108 in the form of template via the Message Composing Wizard 112. The Message Composing Wizard 112 will take this input and update the Inbound Template Database (part #9) 115 (see FIG. 1).

SMS Universal Encoding Template (#5): The SMS Universal Encoding template 113 contains the meta data that defines the categorization (or 'type') of outbound and inbound SMS messages. Each SMS categorization represents a given business intended usage. It provides definition of semantics for encoding as well as for run time.

With this well-defined SMS message categorization, automatic SMS generation with proper encoding reflecting the intended usage is now made possible. Additional SMS message categorization can be further derived from the existing types.

This entity provides an important aspect of this invention as it provides the mechanism for semantic definition and handling, making proper semantic handling in SMS now possible.

With the SMS Universal Encoding Template 113, a business user can define a new SMS message type without any code changes in the Message Encoding Engine 111 and the Run Time Processor 110, making both components generic.

Typed SMS Message Instances (#6): Typed SMS Message Instances 114 are generated by the Message Encoding engine 111, to be used by the Run Time Processor 110. An example of a Typed SMS Message Instance follows:

```
<GenericSMSMessage>
  <short_message_text>Something</short_message_text>
  <ReceiverProfile>
      <userid>steve</userid>
    <cellphonenumber>4161234567@cellphone.com</cellphonenumber>
  <deliverychannel>SMTP</deliverychannel>
 </ReceiverProfile>
</GenericSMSMessage>
```

SMS Response Tracking DB (#7): The SMS Response Tracking Database 116 captures all ResponseRequired messages as required by their encoded type. This enables the runtime processor 110 to ensure that required response messages receive expected responses and perform proper runtime processing. This also enables the base mechanism to handle system expected user initiated inbound messages.

Inbound Template Database (#8): Inbound Template Database 115 stores all business user specified inbound message templates.

Flow Annotation from FIG. 1: The formation, processing, and communication of SMS messages in accordance with the embodiment of the invention depicted are indicated by alphanumerically labelled arrows indicated in FIG. 1. FIG. 2 presents a structural mapping of an SMS commerce system in accordance with FIG. 1. An appreciation of the embodiment can be achieved by reading the description below while referring to FIGS. 1 and 2.

A1: A business user 105 making use of common user interface 106 invokes the SMS Message Composing Wizard (#4) 112 in order to prepare a message.

B1: The business user uses the Message Composing Wizard 112 to send a SMS message based on existing type as defined in the SMS Universal Encoding Template (#5) 113.

A2: The Wizard 112 captures all the user input and calls the Data Collection Interface (#1) 117.

B2: The business user uses the SMS Message Composing Wizard 112 to define a new SMS message type.

A3: The business user uses the Wizard 112 to define a pre-set user response by creating a new inbound template. The Wizard 112 updates the Inbound Template DB (#8) 115.

C1: Message Encoding Engine (#2) 111 retrieves (C1) the SMS Universal Encoding Template (#5) 113;

validates data captured by Data Collection Interface (#1) 117 against the SMS Universal Encoding Template 113 and performs error checking.

C2: Message Encoding Engine 111 generates a Typed SMS Message Instance (#6) 114 as output. Referring to FIG. 2 the message can be an XML encoded message 201.

D2: Message Encoding Engine 111 invokes the Runtime Processor (#3) 110 which retrieves the generated Typed SMS Message Instance 114 generated in C2.

D3: If a user response is required in this SMS message type, the Run Time Processor 110 will register this message as one which required user response by updating the SMS Response Tracking DB (#7) 116.

D4: The Run Time Processor 110 transmits this Typed SMS Message Instance 114 to the Wireless Message Gateway 103, referred to as the everyplace wireless gateway 203 in FIG. 2.

D5: When an incoming SMS message is sent to the Wireless Message Gateway 103, it routes the incoming message to the Run Time Processor 110, which in turn extracts the inbound template ID from the incoming SMS message.

D1: The Run Time Processor 110 reads in the SMS Universal Encoding Template 113 to handle type appropriate semantics for outbound run time processing and that the instances are correct.

D6: The Run Time Processor 110 then extracts the corresponding Inbound Template from the Inbound Template DB (#8) 115 and parses the inbound SMS message using the inbound template. The Run Time Processor 110 decodes the inbound SMS message and routes it to the corresponding Application Component 108 for handling. Communication of SMS between a user's SMS device 120 (FIG. 2) such as a cell phone 101 (FIG. 1) is handled by the telephone company's cell phone interface 102 with which wireless gateway 103 is in communication as required to send and receive messages.

Dx The runtime processor 110 reports runtime error back to the application component 108.

1. SMS Message Categorization (Type)

Method and Apparatus for defining SMS message Categorization

The SMS Universal Encoding Template 113 provides the mechanism of defining SMS message categorisation. It is preferably implemented as a XML schema in which the meta data of an SMS message (e.g. attributes and characteristics of a given message) that constitutes a SMS message category is specified.

The Commerce SMS Message Template is preferably designed to provide commerce typing (categorisation) of SMS messages. The SMS Universal Encoding Template 113 provides a mechanism for a user to extend and define new SMS message types by inheritance from pre-existing defined types. Users can thereby extend the SMS Message type in the original SMS categorization template to define new SMS types.

Business user can use an existing SMS type and extend it to create new message types. Business User only need to specify the new attributes in the extended type. All attributes of the base message type (that this new message type extends from) will be set and the business user does not need to respecify them.

Mechanism of Defining Semantics Associated With A Given SMS Category

In a preferred embodiment of the invention, when an SMS Message need to be encoded, the Message Encoding Engine (#2) 111 calls an XML parser to translate the SMS Universal Encoding Template 113 into Java runtime objects.

The XML parser may be part of the Message Encoding Engine or available to it as may be understood by those skilled in the art. These runtime objects provide the necessary semantic information for the Message Encoding engine 111 to generate SMS messages.

Under these circumstances the Message Encoding Engine 111 can now use the XML parser to parse a given instance of a message against the SMS Universal Encoding Template 113. This provides the automatic mechanism for error checking. Any missing or unexpected information in a given SMS message not appropriate with to the TypeDefinition of the SMS message will result in an error during message parsing.

At run time, the SMS Run Time Processor {#3) 110 also reads in the categorisation information as provided by the SMS Universal Encoding Template 113 in order to handle different run time semantics as well as error checking based on the SMS Message Type.

The runtime processing of SMS messages covers the following aspects:

1. ParsingofoutboundSMSmessages.
2. Errorcheckingoutboundmessages.
3. Messagetrackingandschedulingcapabilities.
4. GenerationofoutboundSMStemplatemessages.
5. Errorcheckinginboundmessages.
6. TranslationofinboundtemplatesintoXMLSMSmessages.
7. Mapping of out bound types to their corresponding inbound SMS messages.

Runtime parsing of outbound SMS messages is possible as they are now encoded in accordance with the templates we have introduced. During this parsing stage information about message type, transmission medium, send priority, etc., is parsed out.

Error checking is an added benefit of this runtime parsing of outbound messages. Since the outbound SMS messages are now strictly type encoded, various errors like missing parameters etc. Can be detected and handled at this stage. This ensures that the final outbound message is correct.

A sample source code listing that can be used to implement an SMS Universal Encoding Template in accordance with one embodiment of the invention follows:

```
<xsd:schema
    xmlns:xsd="http://www.w3.org/2001/XMLSchema"
    xmlns:cep=
"http://www.ibm.com/Websphere Commerce Enabled Portal/SMS Commerce Definition Schema">
  <annotation>
    <documentationxml:lang="en">
      Schema for Websphere Commerce Enabled Portal SMS Commerce Type
    Definition
          Copyright 2002 IBM Corporation
            <documentation>
        </annotation>
```

-continued

```
        <!-Dynamic Context Group Instance-->
        <xsd:elementname="ScheduledGenericSMSMessage"
                    type="ScheduledGenericSMSMessageType",
                    minOccurs="0"/>
        <xsd:element name="ResponseRequiredGenericSMSMessage"
                    type="ResponseRequiredGenericSMSMessageType",
                    minOccurs="0"/>
        <xsd:element name=HighPriorityGenericSMSMessage"
                    type="HighPriorityGenericSMSMessageType",
                    minOccurs="0"/>
        <xsd:element name="GenericSMSMessage"
                    type="GenericSMSMessageType",
                    minOccurs="0"/>
        <xsd:element name="BroadcastSMSMessage"
                    type="BroadcastSMSMessageType"
                    minOccurs="0"/>
<xsd:complexTypename="ScheduledGenericSMSMessageType">
          <xsd:sequence>
                    <xsd:elementname="GenericSMSMessage"
type="GenericSMSMessage Type"/>
                    <xsd:attribute name="DateToBeSentOn" type="xs:date"/>
                    <xsd:attribute,name="TimeToBeSentOn"type="xs:time"/>
            </xsd:sequence>
</xsd:complexType>
<xsd:complexTypename="ResponseRequiredGenericSMSMessageType">
          <xsd:sequence>
                    <xsd:element name="GenericSMSMessage"
type="GenericSMSMessage Type"/>
                    <xsd:attribute name="InboundTemplateid"type="xs:string"/>
          </xsd:sequence>
</xsd:complexType>
<_xsd: complexType name="HighPriorityGenericSMSMessageType">
            <xsd:sequence>
            <xsd:element name="GenericSMSMessage" ="GenericSMSMessageType"/>
                <xsd:attribute name="DeliveryPriority"
     type="DeliveryPriorityType" fixed="HIGH"/>
                </xsd:sequence>
</xsd:complexType>
<xsd:complexType name="GenericSMSMessageType">
            <Xsd:sequence>
            <xsd:element name="short_message_text" type="xsd:string"
maxLength="160"/>
            <xsd:attribute name="ReceiverProfile" type="ReceiverProfileType"
minOccurs="1"maxOccurs="1"/>
            </xsd:sequence>
</xsd:complexType>
<xsd:complexType name="BroadcastSMSMessageType">
            <xsd:sequence>
            <xsd:element name="short_message_text" type="xsd:string"
maxLength="160"/>
            <xsd:attribute name="ReceiverProfile" type="ReceiverProfileType"
minOccurs="1" maxOccurs="unbounded"/>
            </xsd:sequence>
</xsd:complexType>
<xsd:simpleTypename="DeliverPriorityType">
            <xsd:restrictionbase="xsd:string">
              <xsd:enumerationvalue="HIGH"/>
              <xsd:enumeration value="MEDIUM"/>
            <xsd:enumerationvalue="LOW"/>
            </xsd:restriction>
            </xsd:simpleType>
<xsd:complexTypename="ReceiverTransmissionProfileType">
            <xsd:sequence>
                        <xsd:element name="userid" type="xsd:string"/>
            <xsd:element name="cellphonenumber" type="xsd:string"/ >
            <xsd:element name="deliverychannel" type="DeliveryChannelType"/>
            </xsd:sequence>
  </xsd:complexType>
  cxsd:simpleType name="DeliveryChannelType">
            <xsd:restriction base="xsd:string">
            <xsd:enumerationvalue="SMTP"/>
            <xsd:enumeration value="GSM"/>
            <xsd:enumerationvalue="SNPP"/>
                      <xsd:enumerationvalue="Mobitex"/>
            <xsd:enumeration value="DataTAC"/>
            </xsd:restriction>
            </xsd:simpleType>
</xsd:schema>
```

The following source code listing provides an illustration of a Typed (Categorized) SMS Message Instance

```
XSD Schema Definition of Commerce Payment Exception SMS Message
<xsd:complexType name="PaymentExceptionSMSMessage">
    <xsd:sequence>
        <xsd:elementname="ResponseRequiredSMSMessage"
        type="ResponseRequiredSMSMessageType"/>
    </xsd:sequence>
</xsd:complex Type>
Message Instance of a Payment Exception SMS Message
<PaymentExceptionSMSMessage>
    <ResponseRequiredSMSMessage>
        <HighPriorityGenericSMSMes sage>
            <GenericSMSMessage>
                <short_message_text>
                    Your cheque bounced!
                </short_message_text>
                <ReceiverProfile>
                    <userid>steve</userid>
                    <cellphonenumber>
                        4161234567@cellphone.com
                    </cellphonenumber>
                    <deliverychannel>SMTP</deliver ychannel>
                </ReceiverProfile>
            </GenericSMSMessage>
            <DeliveryPriority>HIGH</DeliveryPriority>
        </HighPriorityGenericSMSMessage>
        <ConfirmationOfDelivery>CONFIRMED</ConfirmationOfDelivery>
    </ResponseRequiredSMSMessage>
</PaymentExceptionSMSMessage>
XSD Schema Definition of Campaign Started Broadcast SMS Message
<xsd:complexTypename="CampaignStartedSMSMessage">
    <xsd:sequence>
        <xsd:elementname="BroadcastSMSMessage"
        type="BroadcastSMSMessa geType"/>
    </xsd:sequence>
</xsd:complexType >
Message Instance of a Campaign Started SMS Message
    <CampaignStartedSMSMessage>
        <BroadcastSMSMess age>
            <short_message_text>
                New campaign has been started, visit our website
            </short_message_text>
            <ReceiverProfile>
                <userid>steve</userid>
                <cellphonenumber>
                    4161234567@cellphone.com
                </cellphonenumber>
                <deliverychannel>SMTP</deliverychannel>
        </ReceiverProfile>
        <ReceiverProfile>
            <userid>joe</u serid>
            <cellphonenumber>
                4161234568@cellphone.com
            </cellphonenumber>
            <deliverychannel>SMTP</deliverychannel>
        </ReceiverProfile>
    </BroadcastSMSMess age>
</CampaignStartedSMSMess age>
```

The SMS Encoding engine 111 can automatically generate an SMS Message instance based on the SMS message type selected. The SMS Message Runtime Processor 110 is adapted to handle the semantics of a given predefined type. At runtime, if a SMS message sent is a ResponseRequiredSMSMessageType, the SMS Message Runtime Processor 110 waits a preset wait time for user confirmation. If confirmation is not received after the preset wait time, the runtime processor 110 will sent the error to the corresponding application component 108 so that action can be performed according to that stipulated in the business process represented by that application component. For example, application component 108 may provide for resending, or rollbacking the transaction and marking this transaction as having failed completion. (Dx of FIG. 1 Runtime processor 110 reports run time error to the application component for handling)

How a User Creates a New SMS Type By Extending From an Existing Type

Figure 3:
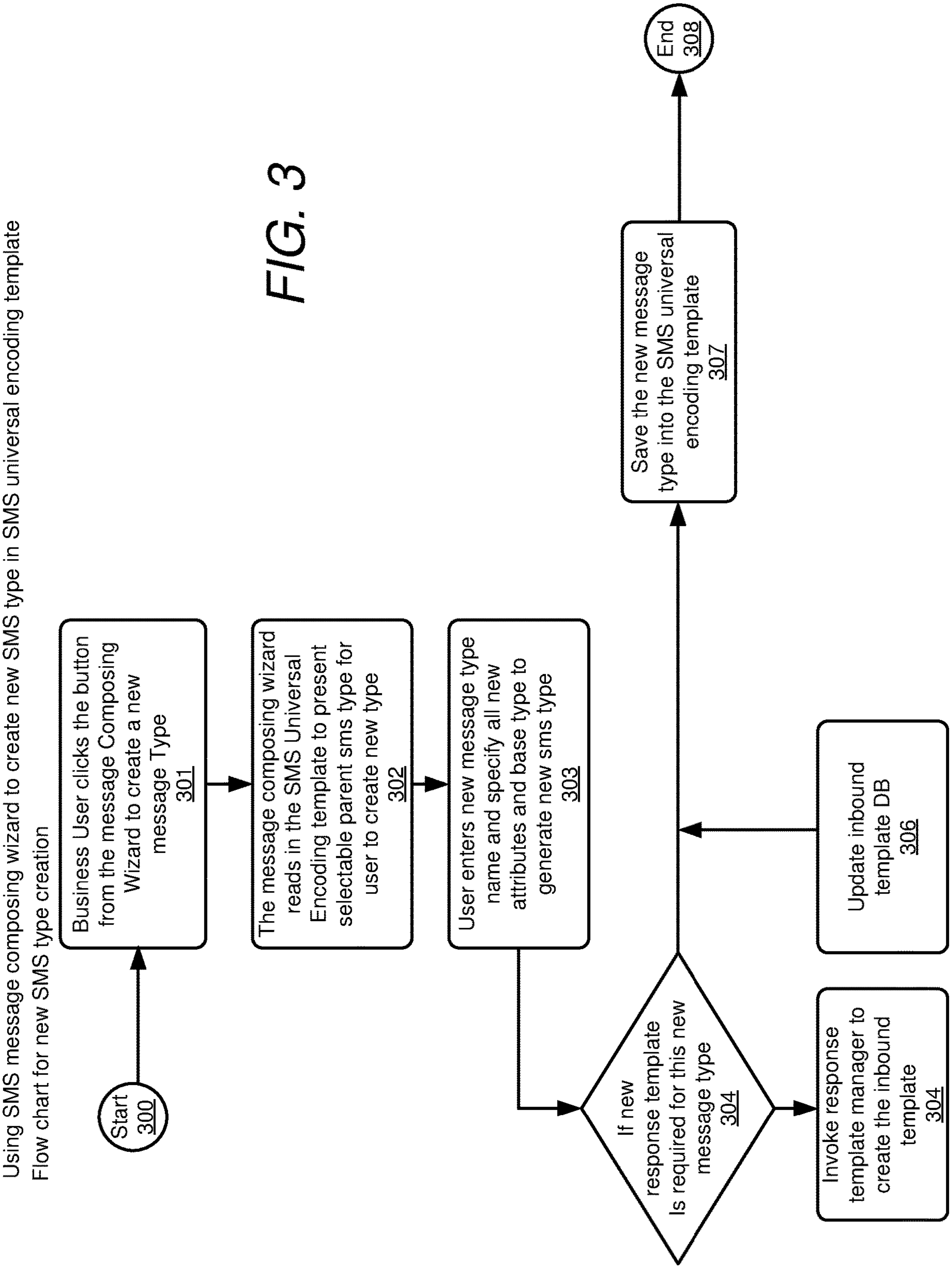
FIG. 3 depicts using SMS Message Composing Wizard To Create New SMS Type in SMS Universal Encoding Template.

Referring to FIG. 3, which depicts a process for Using SMS Message Composing Wizard To Create a New SMS Type In the SMS Universal Encoding Template, and FIG. 1, which depicts a SMS Message Composing GUI for creating anew SMS type it will be readily understood how anew SMS type can be created using an embodiment of the invention.

In order the start 300 the process a business user clicks a button provided on the Message Composing Wizard 112 (see FIGS. 1, 2) to instruct the system of the embodiment to create a new message type 301. The message composing wizard then reads in the SMS universal encoding template 113 (FIGS. 1, 2) to present a selectable parent SMS type 405 for the user to create a new type in step 302. In step 303 the user enters a new message type name (see 404) and specifies all new attributes indicated by provided descriptions, 406, 407, 408, 409, 410, 411, 44, 415, 416, and the base (parent) type 405, to generate a new SMS type. Add and Delete buttons, 412, and 413 respectively allow insertion and deletion of items in the reply section, while buttons 402 and 403 are used to save or cancel the new message type as will be appreciated.

If a new response template is required for the new message type, 304 the response template manager is invoked by the business user to create the inbound template required, 305 and the inbound template database 115 is updated, 306. If a new response template is not needed the new message type is saved, 307, in the SMS universal encoding template 113, reaching the end 308 of the process depicted in FIG. 3.

2. Encoding End to End Flow

Figure 5:
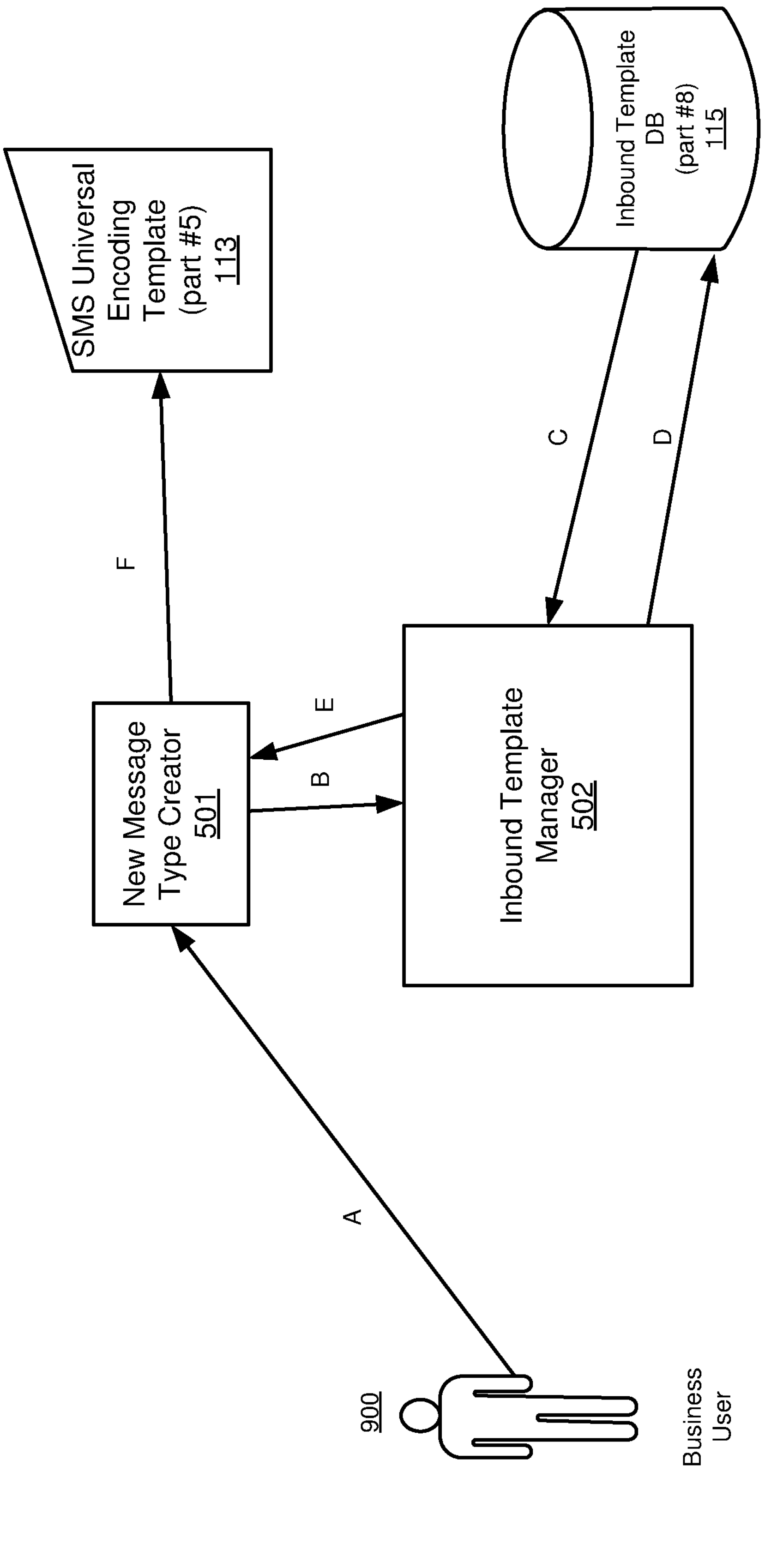
FIG. 5 depicts an SMS Encoding Flow Diagram.

Referring to FIG. 5, which illustrates SMS message encoding flow following will be understood:

A: Business User invokes New Message Type Creator to create a new Message Type.

B: Business User invokes Inbound Template Manager to create a new Inbound Template for the new Message Type (thru the Inbound Template Manager).

C: Inbound Template Manager retrieves a list of pre-defined command list from the Inbound Template DB. The command list is defined by the Application Component owners.

D: Inbound Template Manager inserts a new row into the Inbound Template DB with the Response Action and Command selected by the Business User from the GUI.

E: Inbound Template Manager returns the newly created Inbound Template ID (generated by the Inbound Template DB) to the New Message Type Creator.

F: New Message Type Creator then saves the newly created message type (imbedded with the Inbound Template ID) into the SMS Universal Encoding Template (part #5).

2.1 Encoding An Outbound Message Only Message

The SMS Composing Wizard allows business user to send a message to any registered users in the e-commerce system. The business user just has to select a type of message, enter the message text and click the Submit button.

Figure 6:
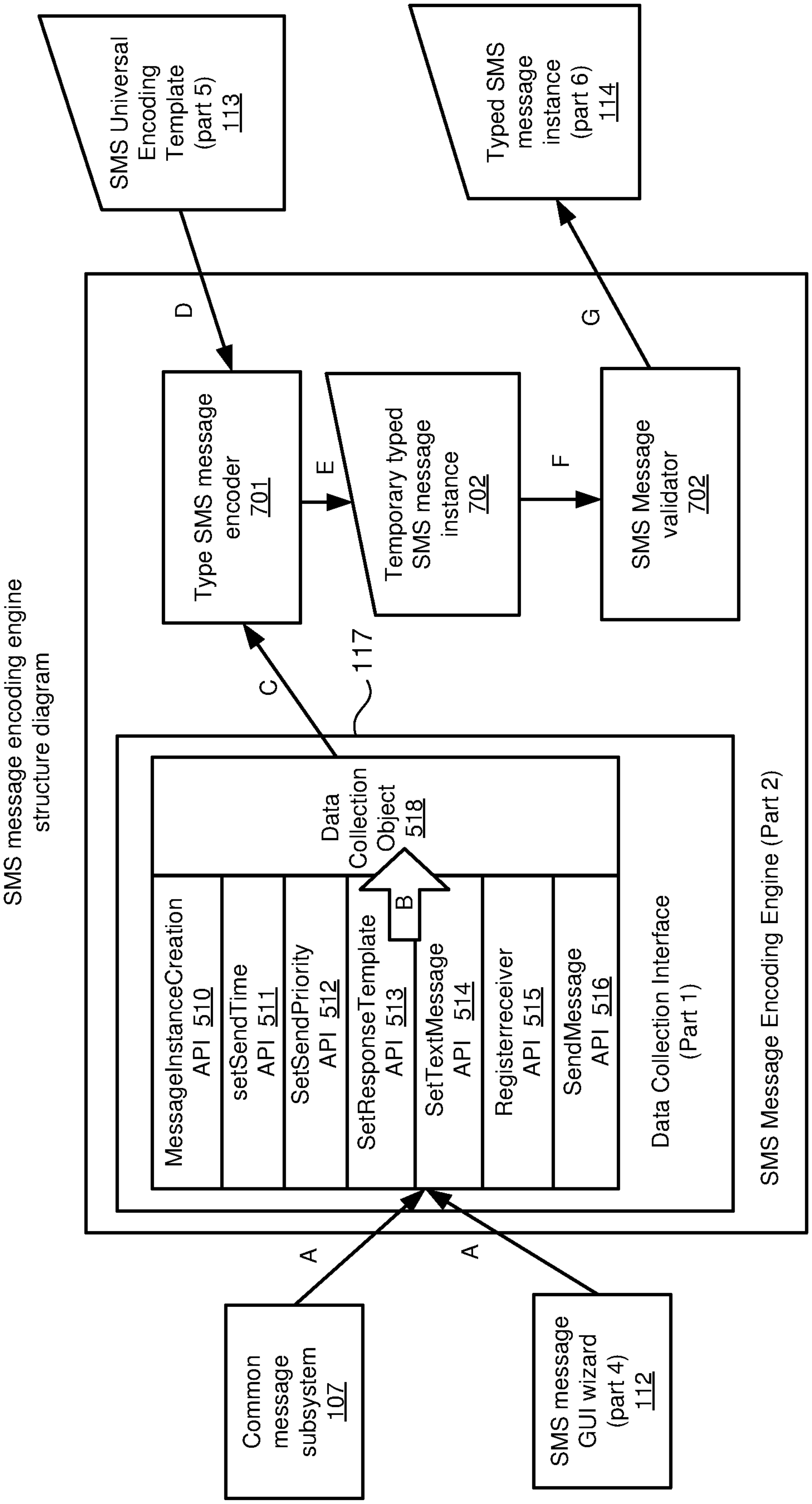
FIG. 6 depicts an SMS Message Encoding Engine DCI Structure Diagram.
Figure 7:
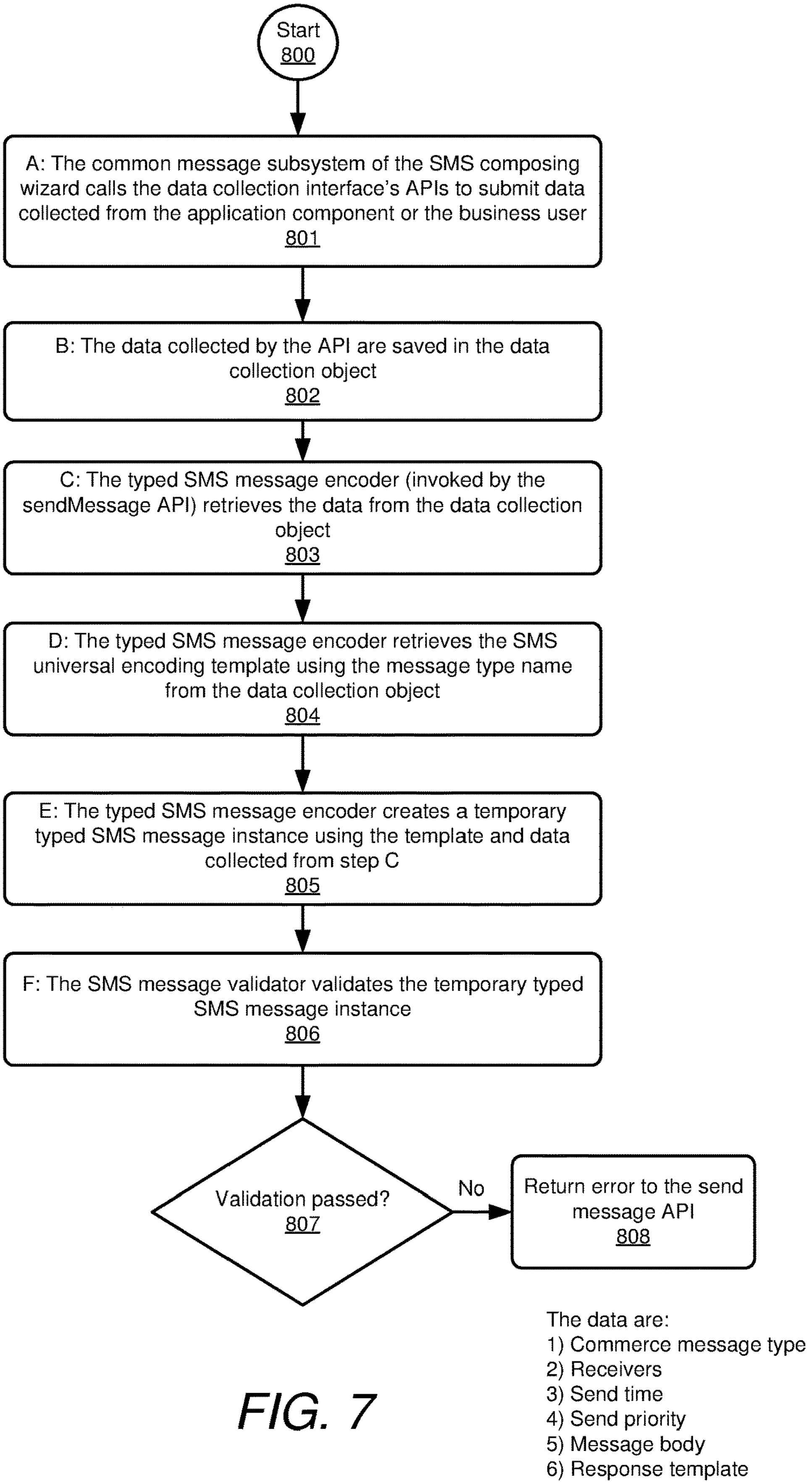
FIG. 7 depicts an SMS Message Encoding Engine Flow Diagram.

Micro Flow: Data Collection Interface. SMS Input Data Collection and Message Encoding Engine Message processing by the encoding engine is shown by alphabetically labelled arrows in FIG. 6 as discussed below.

A: Common Message Subsystem 107 or the SMS Message GUI Wizard (part #4) 112 calls the Data Collection Interface's 117 AP is (part #1) 510-516 to pass data collected from the message originator:

B: The Data Collection Interface's AP is 510-516 pass the data to the Data Collection Object 518. For example, calling the set Text Message API 514 with the message text as parameter, the API 514 will save the text in the Data Collection Object 518.

C: The send Message API 516 invokes the Typed SMS message encoder 701. It retrieves the message type name from the Data Collection Object 518. The message type name is captured by the message instance Creation API 510. In this step, the Typed SMS message encoder 701 also collects other information from the Data Collection Object 518; such as: send time, send priority, Response Template Id, text message, receiver info.

D: Using the message type name, the Typed SMS message encoder 701 retrieves the SMS Universal Encoding template 113 for this message type.

E: The Typed SMS message encoder 701 creates a Temporary Typed SMS Message Instance 702 by converting the SMS Universal Encoding template 113 into a temporary Typed SMS message instance 702 expressed in Document Object Model (which is an internal structure for XML) and fills in the information collected from the Data Collection Object 518 in C.

F: The Temporary Typed SMS Message Instance 702 is then passed to the SMS Message Validator 703 to perform validation. The validation process involves checking of mandatory data, data semantic, data syntax, data range.

G: If validation is successful, the SMS Message Validator will copy the Temporary Typed SMS Message Instance 702 into the final Typed SMS Message Instance (part #6) 114.

Figure 8:
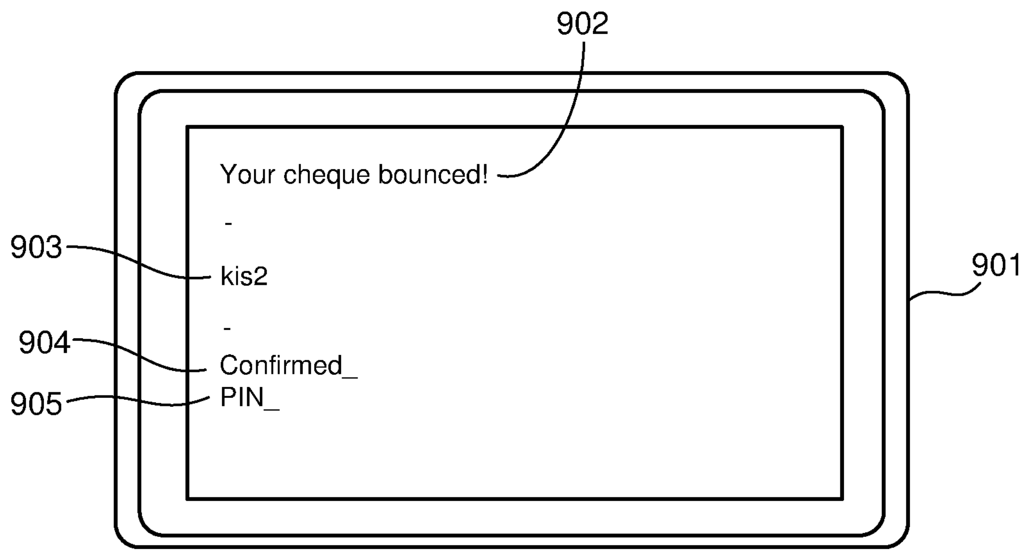
FIG. 8 depicts an actual Outbound SMS message example as seen by a recipient user.

Steps 801 to 808 of FIG. 8 depict the process above in a graphical flow diagram.

2.2 Encoding A Response Required Message

For a SMS message that requires a response, an Inbound Template should be included in the original outbound SMS message to a recipient. The Inbound Template provides a form based input mechanism for the recipient; it is adapted to encode the expected response of the recipient of a SMS message. The Inbound Template eases the burden of the recipient user trying to formulate a response back to the Application Component 108 that originated the outbound SMS message to the recipient. The response template serves to constrain the user's response by indicating the format of the response required to the user. As a result, the user's response will be in a form that can be processed automatically by the web application server on its return.

Inbound Template: The structure of an inbound template is illustrated below:

<Short Message Text>

--

<Encrypted String>

<response action 1>

<response action 2>

<response action n>

PIN:<mobile user personal identification>

The Inbound Template structure depicted above supports multiple response actions. Depending on the type of transaction, the recipient, likely a mobile user, will pick one of the response actions.

FIG. 8 depicts the appearance of an outbound SMS message with indications of a required response to a recipient user as it would appear on the user's digital cell phone screen 901.

The SMS Message string to achieve this would resemble: Your cheque bounced!-kis2-CONFIRMED:_PIN:_

2.2.1 SMS Response Message Encoding Template Elements

Figure 9:
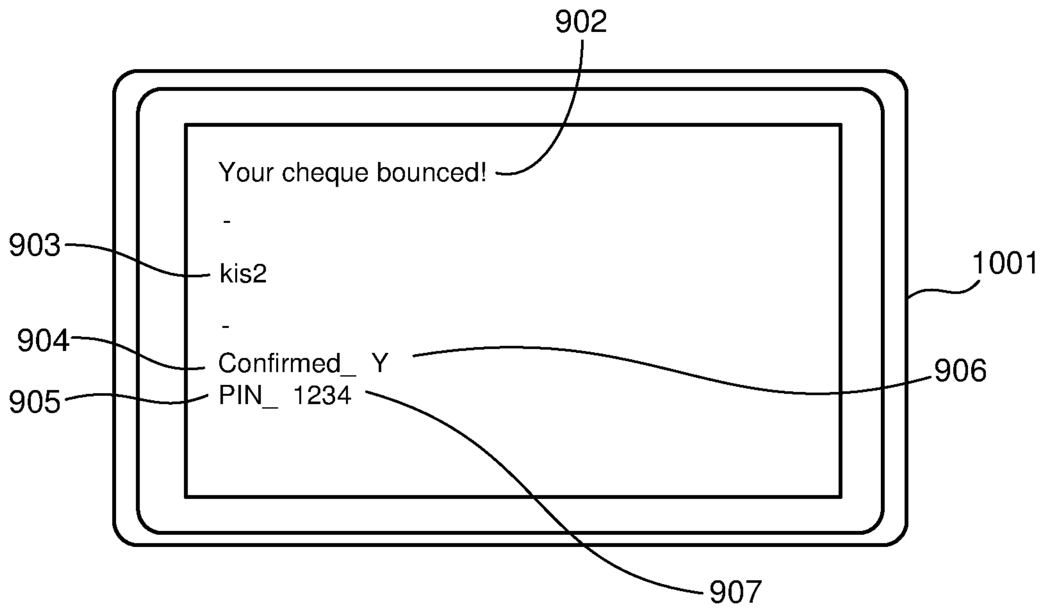

As may be seen from FIG. 9 the SMS response message encoding template elements for the inbound template include the following:

C Short Message Text, 902

C Encrypted String, 903

C <response action, 904>:<response data, 906>

C PIN, 905

Figure 10:
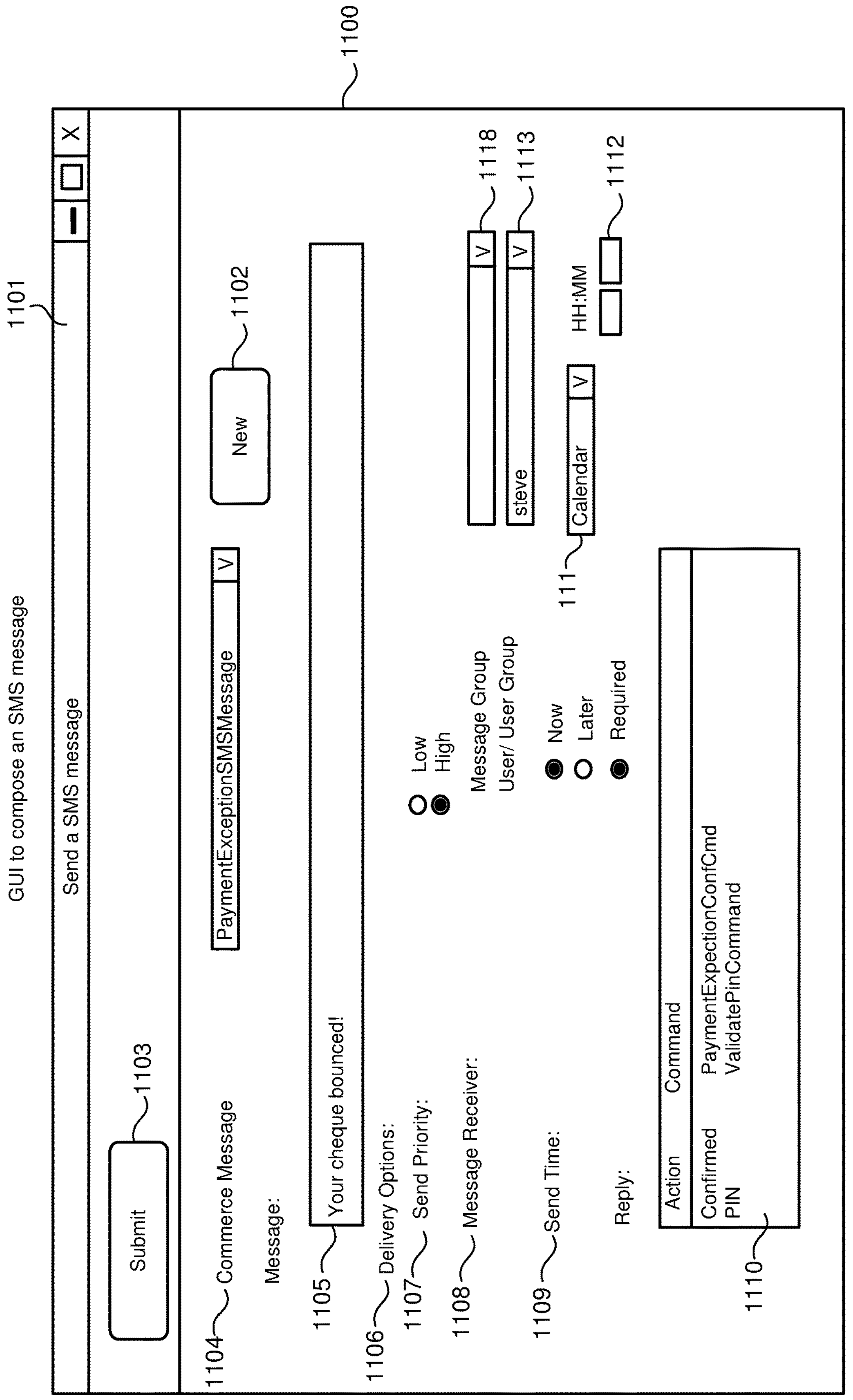
FIG. 10 depicts a GUI to compose a SMS message.

FIG. 10 illustrates an SMS inbound message with a user response entered before being sent.

2.2.1.1 Short Message Text 902

This is the message that the message originator intended to send to the receiver.

2.2.1.2 Encrypted String 903

Encrypted String is a four character hashed string delimited by a pair of '-'.

The encrypted string is built upon the amalgamation of the following information:

web application id (predefined by web app administrator, e.g. store ID)

userid (login id of the receiver of this store)

inbound template id (that includes command and expected parameter) as per database entry. This can be obtained from the Inbound Template DB (part #8)

Action id (id representing the response actions allowed in this message)

Hash Key—the user can change anytime to make the key expire. This can be saved in a file in restricted directory.

The Runtime Processor 110 is responsible for generating this encrypted string using the above information as input. The Runtime Processor is also responsible for generating the Inbound Template before transferring the SMS message to the Wireless Message Gateway 103.

Advantage of using the encrypted string:

the encrypted string can be limited to 4 bytes to save space from the 160 character limit Encrypted string is unintelligible Hash Key can be changed anytime by the business user to impose an arbitrary time out Runtime Processor 110 can filter out unwanted incoming messages. An invalid or a missing encrypted string indicates the message is unwanted.

Users can store the inbound template in their mobile devices so that they can initiate transactions with the designated web application any time at their own volition. This advantage will be discussed in detail in section 2.3.

2.2.1.3 <Response Action>:<Response Data>

Response action 904 is a keyword to identify allowable response actions and the corresponding parameters. In the example, the allowable response 904 is CONFIRMED. In this example, FIG. 10 the user has entered the response 906 Y. There can be more than one allowable responses for different transactions. There are three sub-elements in this response:

1. Response Action—the Keyword Representing the Action. E.G., CONFIRMED
2. Command—a Web Application Program or Command Which the Runtime Processor will Invoke These response actions and commands are saved in the Inbound Template DB (part #8) indexed by unique Inbound Template ID. Business user can use the SMS Message Composing Wizard (part #4) to manage these response actions. Refer to section 2.2.3 How to manage Inbound Template using the SMS Message Composing Wizard.

The runtime processor will invoke the command with the <response data 906> when the responding SMS message is received.

2.2.1.4 PIN

The PIN element 905 provides for a user to enter a PIN number 904 specified by the user at user registration the user entered 1234 in this example). With the PIN and the userid (encrypted in the Encrypted string) the Runtime processor 110 can authenticate the originality of the inbound message.

2.2.2. SMS Response Showing What a User Would Have Input in the Response FIG. 9 Illustrates the Screen 1001 of a Digital Cell Phone with a User Response When the mobile cell phone user responded to the SMS message, the user would just have to select "forward message" to a designated phone number for the web application; enter the response data for one of the response actions, enter the PIN number and hit the "send" button.

In this example, the mobile cell phone user entered Y 906 beside CONFIRMED: 904 to indicate that he/she acknowledged the message.

The SMS Message that would be received by the web application would resemble:

Your cheque bounced!-kis2-CONFIRMED:Y PIN:1234

For the processing of an inbound SMS message, please refer to section 3.2 "Response Required Message and Inbound Message End To End Flow".

2.2.3 How to Manage Inbound Template using the SMS-Message Composing Wizard

Inbound Template Manager 502 (see FIG. 5), a sub-component of the SMS Message Composing Wizard (part #4) (see FIG. 4), is responsible for managing inbound templates. This includes creation and deletion of the mapping between the response actions and the web application commands.

2.2.3.1 GUI

FIG. 10 illustrates a GUI 1101 that could be used to compose a SMS message that would be sent by the web application server to a mobile user. In this instance it is illustrating a GUI for a payment exception message that could have been used to produce the message of FIG. 8.

Figure 4:
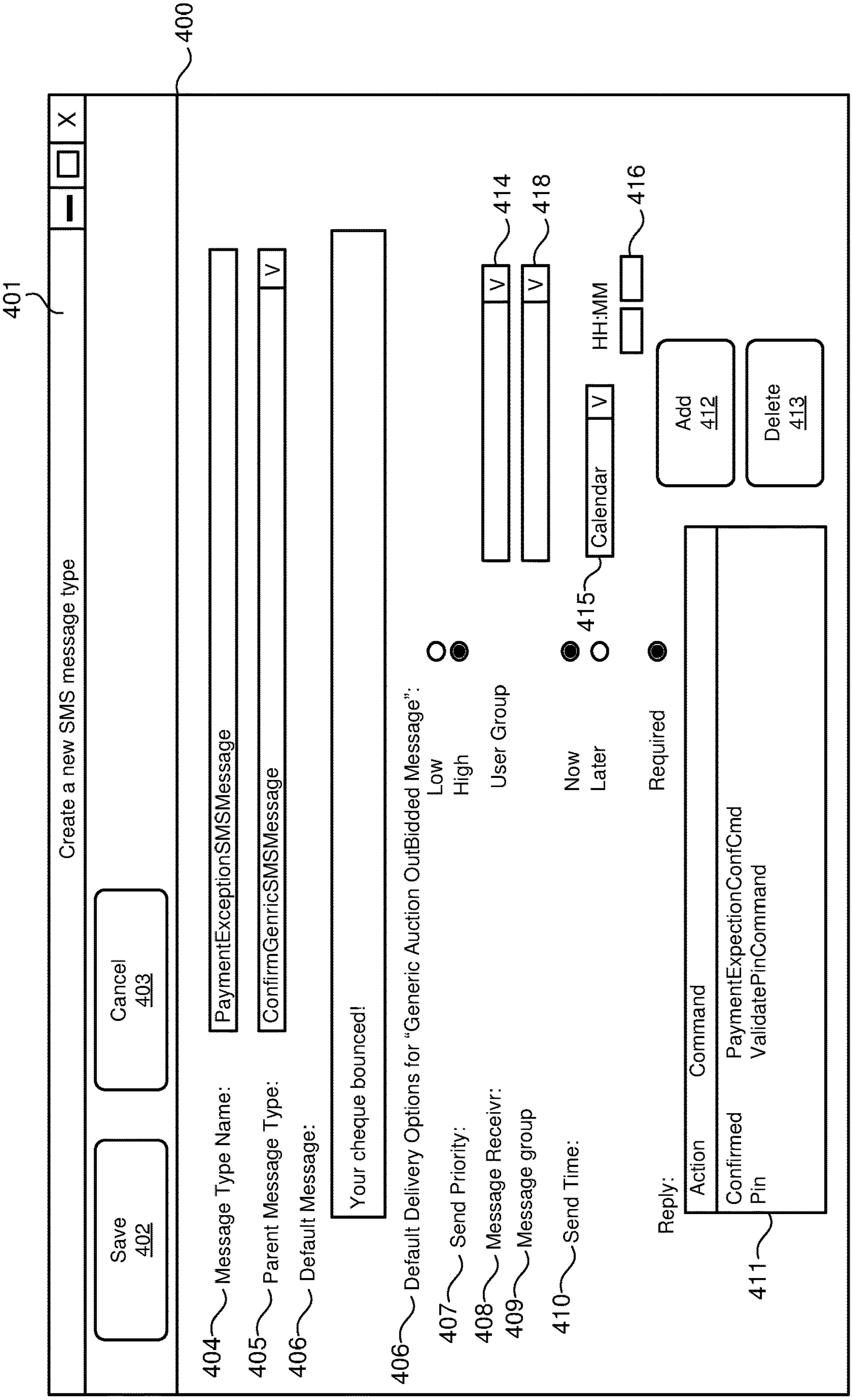
FIG. 4 depicts using The SMS Message Composing GUI to create new SMS type 16.

If a business user wanted to create a new SMS message type derived from this GUI 1101 pressing NEW button 1102 would invoke the Create a new SMS Message Type panel 400 as illustrated in FIG. 4. This panel could then be used to create a new message type.

Figure 11:
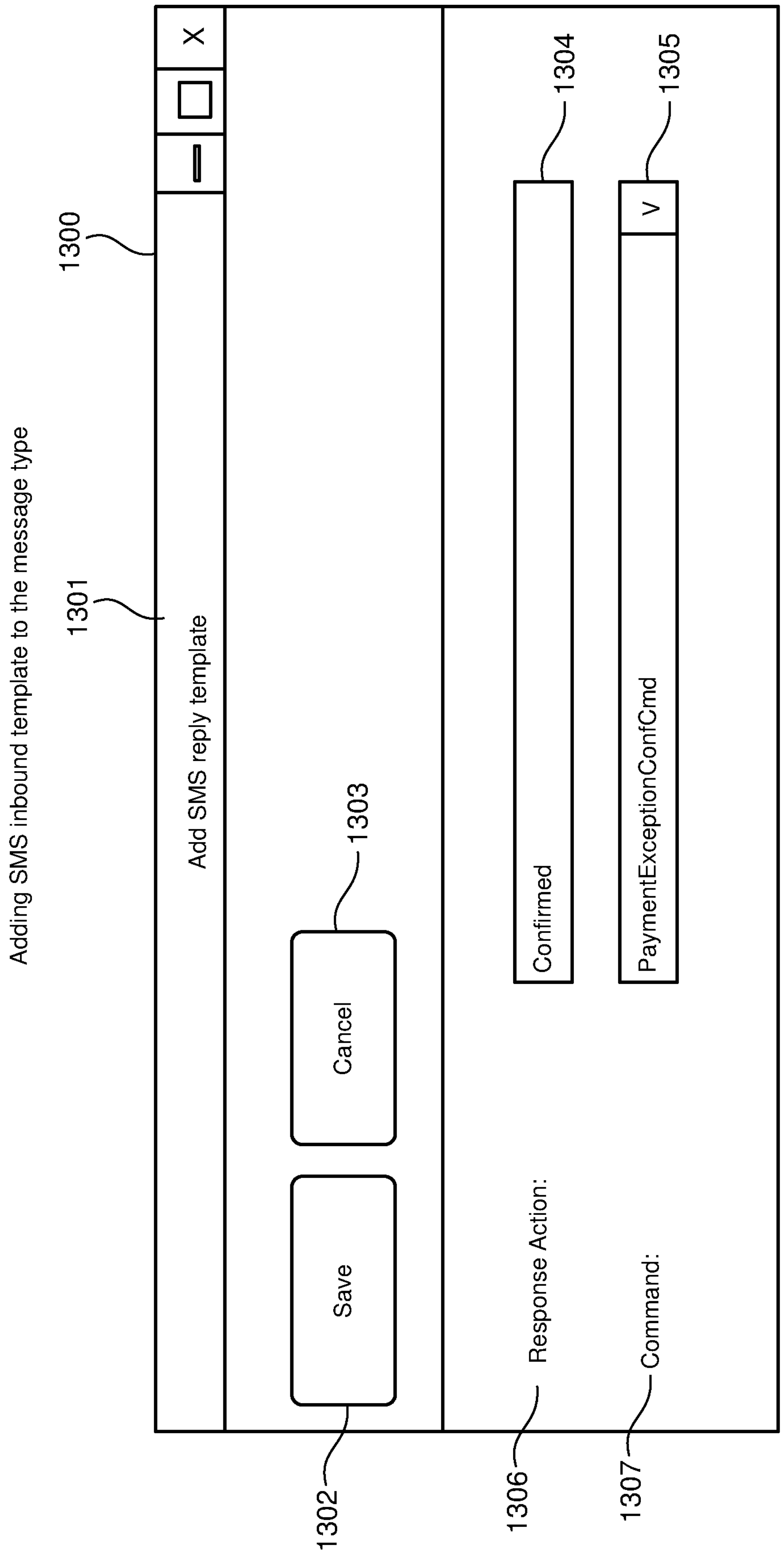
FIG. 11 depicts adding SMS Inbound Template to the message type.

Click on "Add" button 412 will invoke Add SMS (Reply) Inbound Template panel illustrated in FIG. 11:

2.2.3.2 Inbound Template Manager Structure Diagram

Figure 12:
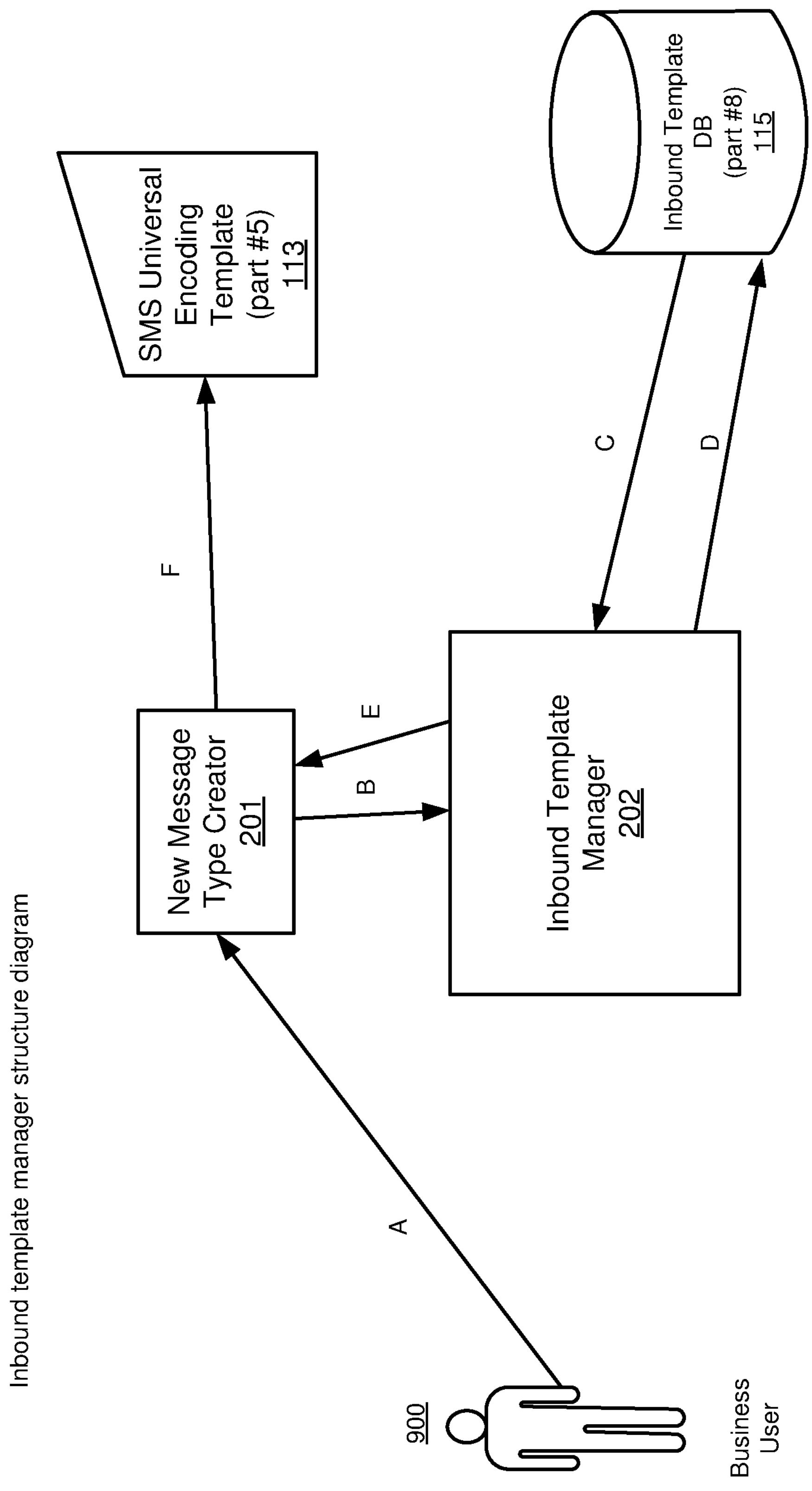
FIG. 12 depicts an inbound Template Manager Structure Diagram.

FIG. 12 illustrates the structure of the inbound template manager 202.

The flow annotation for the inbound template manager follows:

A: Business User 900 invokes New Message Type Creator 201 to create a new Message Type.

B: Business User 900 invokes Inbound Template Manager 202 to create a new Inbound Template for the new Message Type.

C: Inbound Template Manager retrieves a list of predefined commands from the Inbound Template DB 115. The command list is defined by Application Component 108 (FIG. 1).

D: Inbound Template Manager 202 collects the information from GUI and update the Inbound Template DB 115.

E: Inbound Template Manager 202 returns the newly created Inbound Template ID (generated by the Inbound Template DB 115) to the New Message Type Creator 201.

F: New Message Type Creator 201 then saves the newly created message type (imbedded with the Inbound Template ID) into the SMS Universal Encoding Template (part #5) 113.

2.2.3.3 Managing Inbound Template Flow Chart

Figure 13:
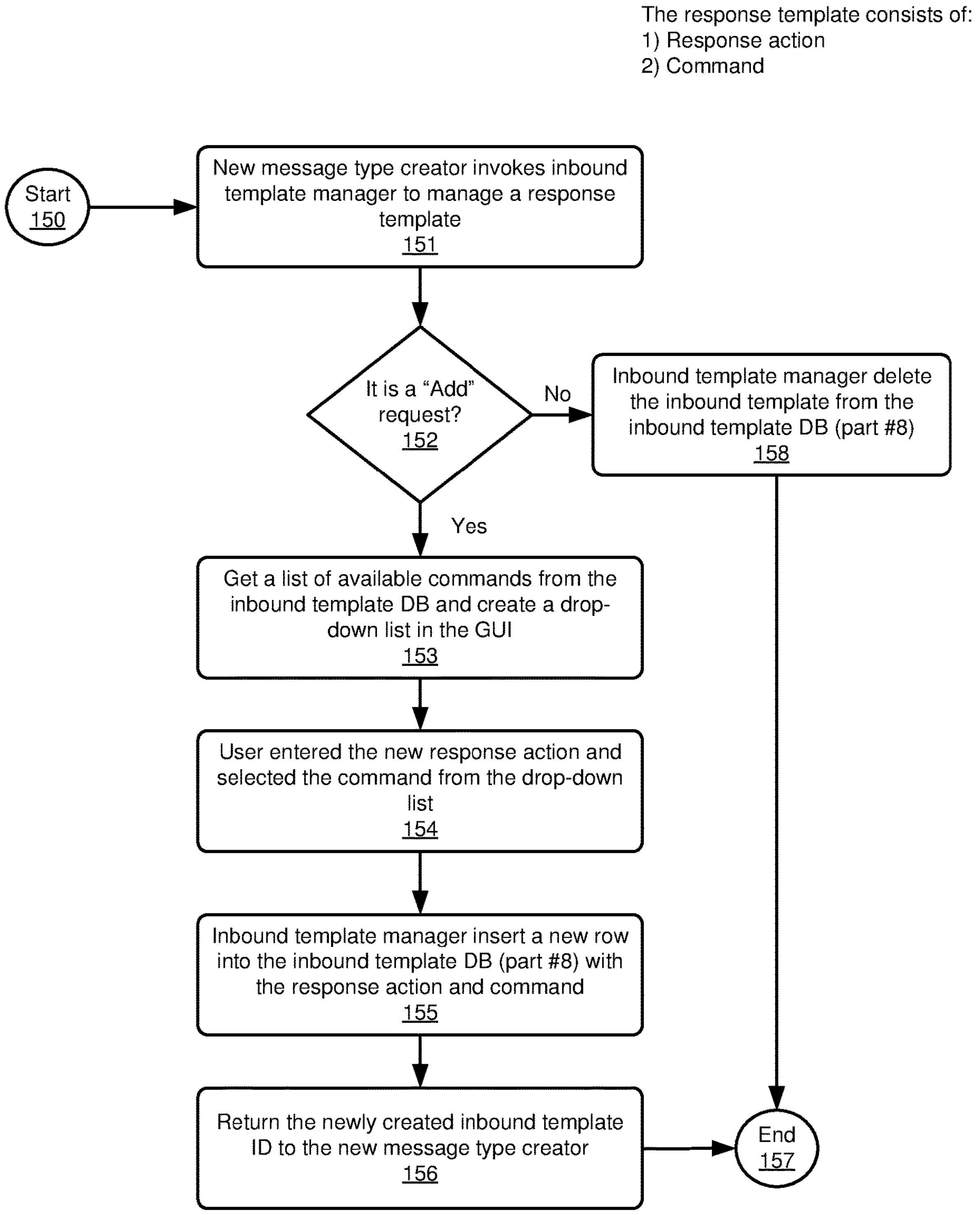
FIG. 13 depicts the Flow For the Inbound Template Management.

FIG. 13 illustrates a flow chart depicting the steps 150 to 158 of how an SMS Message Composing Wizard would be used to manage the response actions described above:

Encoding An Inbound Message For User's consumption

Another useful application of the Inbound template is to allow mobile users to submit requests to the web application. For example, a user can send to the web application a request for account balance. Using a saved Inbound template for account balance request in the mobile device, the user can send this inbound template as an inbound SMS message. In response to this request, the web application will send the account balance as an outbound SMS message assuming the incoming message passed validation and authentication.

2.3.1 Steps to Implement this Feature:

Step 1: Business User defines a list of inbound templates. using similar procedures in creating a new message type. called "InboundRequestGenericMsg" must be defined first.

This can be done A new message type The Business user can then derive another inbound request message type with inbound template attached.

Step 2: An Application component called "Customer Services" publishes a list of defined Inbound Templates in the store web site.

Step 3: Users logon on to the store web site and select the inbound templates they wish to download.

Step 4: The Customer Service Application Component sends the selected Inbound Templates to the mobile device. The transmission can be completed by using the Command Message Subsystem which calls the Data Collection Interface's APs (part #1).

2.3.1 Structure Diagram

Figure 14:
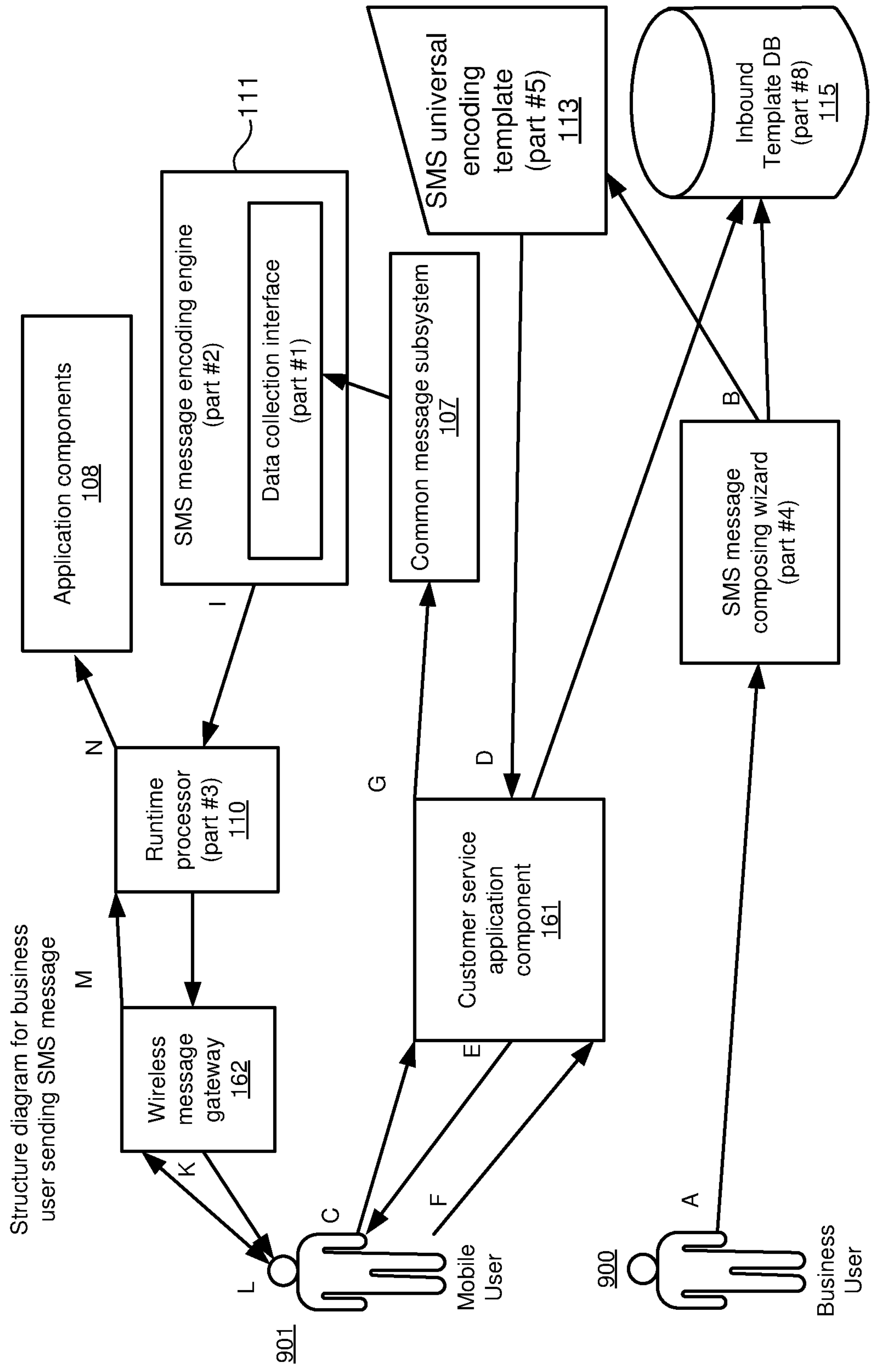
FIG. 14 depicts Structure Diagram For Business User Sending SMS Message.

FIG. 14 depicts a Structure Diagram of a SMS system in accordance with a preferred embodiment of the present invention depicting the process of a Business User Sending an SMS Message.

The flow annotation follows:

A: Business user 900 defines new message types and corresponded inbound templates. This is done by using the SMS Message Composing Wizard 112 {FIG. 1).

B: SMS Message Composing Wizard 112 stores these new message types and inbound templates in the SMS Universal Encoding Template (part #5) 113 and Inbound Template DB (part #8) 115 respectively.

C: Mobile user 901 logons to the web site for the system and requests a list of inbound templates.

D: The Customer Service Application Component 161 obtains the Inbound Template IDs from the SMS Universal Encoding Template 113. Using the IDs, the Customer Service Application Component 161 retrieves the available inbound templates from the Inbound Template DB 115 using the IDs.

E: The Customer Service Application Component 161 displays the list of inbound templates to the mobile user 901.

F: The mobile user 901 selects the inbound templates desired and requests them to be sent to his/her mobile device.

G: The Customer Service Application Component 161 sends a request to the Command Message Subsystem 107 to send the selected inbound templates as generic SMS messages.

H: The Command Message Subsystem 107 calls the Data Collection Interface's AP is (part #1) 117 to transmit the inbound templates as generic SMS messages.

I: The SMS Message Encoding Engine (part #2) 111 encodes the SMS messages containing the inbound templates and sends them to the Runtime Processor (part #3) 110.

J: The Runtime Processor 110 inserts an encrypted string into the SMS messages. This encrypted string preferably should not have an expiration time since the templates will be used for input requests. The SMS messages are sent to the Wireless Message Gateway 162.

K: Wireless Message Gateway 162 delivers these messages to the mobile user 901.

L: Mobile user 901 saves these inbound templates in the storage of his/her mobile device. Mobile user 901 can now use these inbound templates to submit a request or requests to the application component 108.

M: The Wireless Gateway 162 transfers inbound SMS messages from mobile users to the Runtime Processor 110.

N: The Runtime Processor 110 examines the encrypted string in an inbound SMS message to determine if this is an inbound request. If the message is authenticated, the Runtime Processor 110 will invoke the corresponding command owned by the relevant Application Component 108 of the SMS enabled commerce system.

2.3.2 Flow Chart

Figure 15:
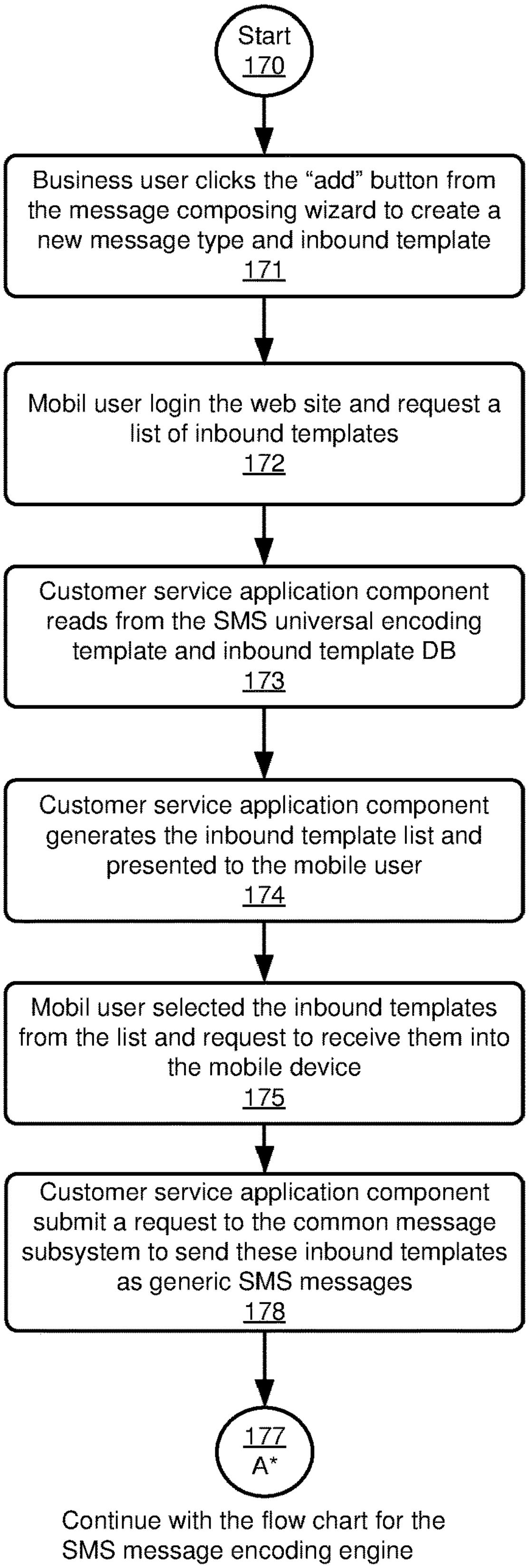
FIG. 15 depicts a Flow chart for FIG. 16.

FIG. 15 illustrates a flow chart of a business user obtaining selected inbound templates in accordance with a preferred embodiment of the present invention similar to that depicted in FIG. 13.

3. Run Time End To End Flow

This section outlines runtime processing of an embodiment of the present invention, cover outbound message generation and inbound response message processing.

3.1 Outbound Message End to End Message Processing Flow

FIG. 5 outbound flow diagram depicting outbound message handling flow of an SMS e-commerce system of one embodiment of the present invention.

Figure 17A:
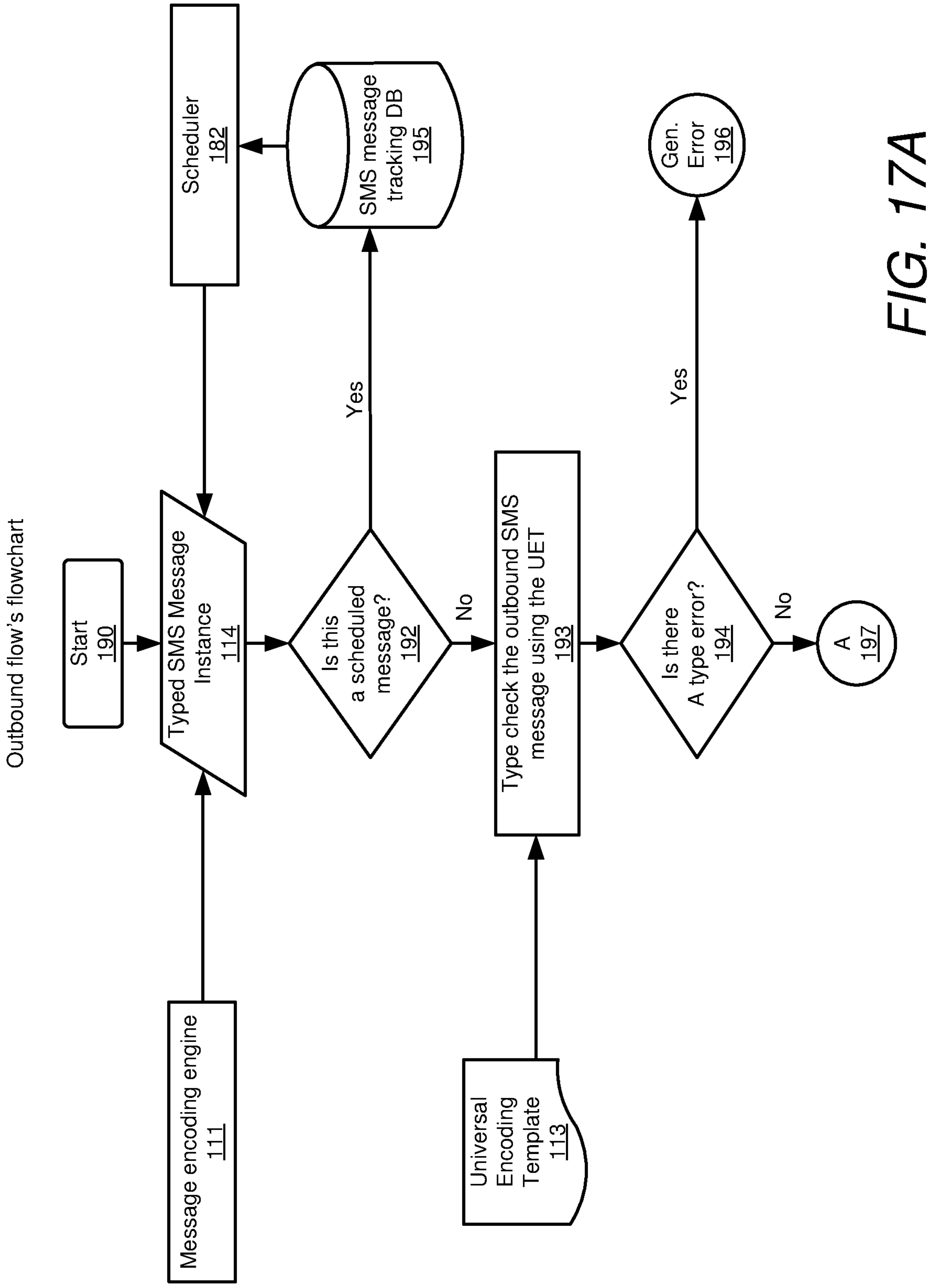
FIG. 17*a* depicts an Outbound Flow Diagram 1.
Figure 17B:
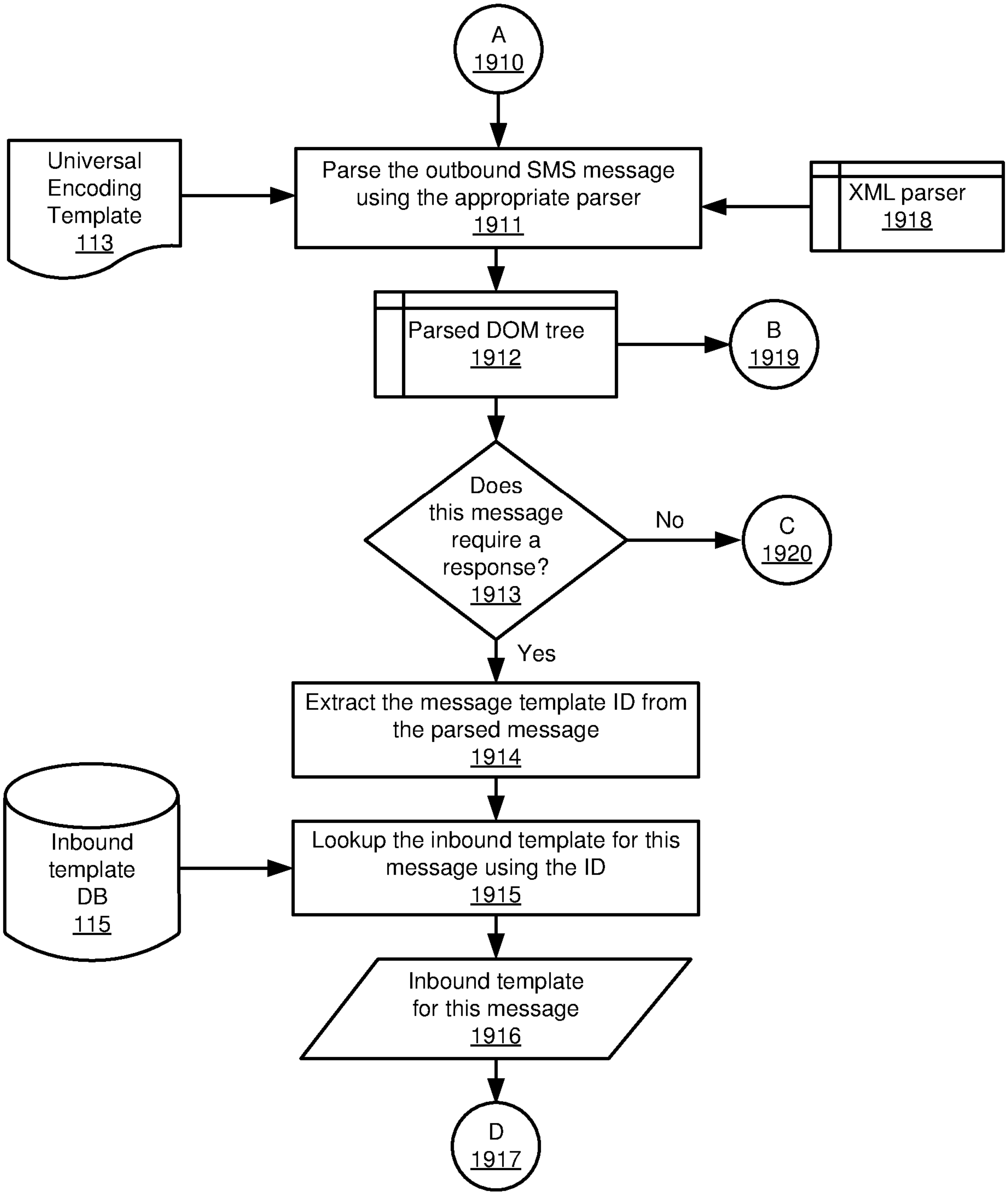
FIG. 17*b* depicts an Outbound Flow Diagram 2.
Figure 17C:
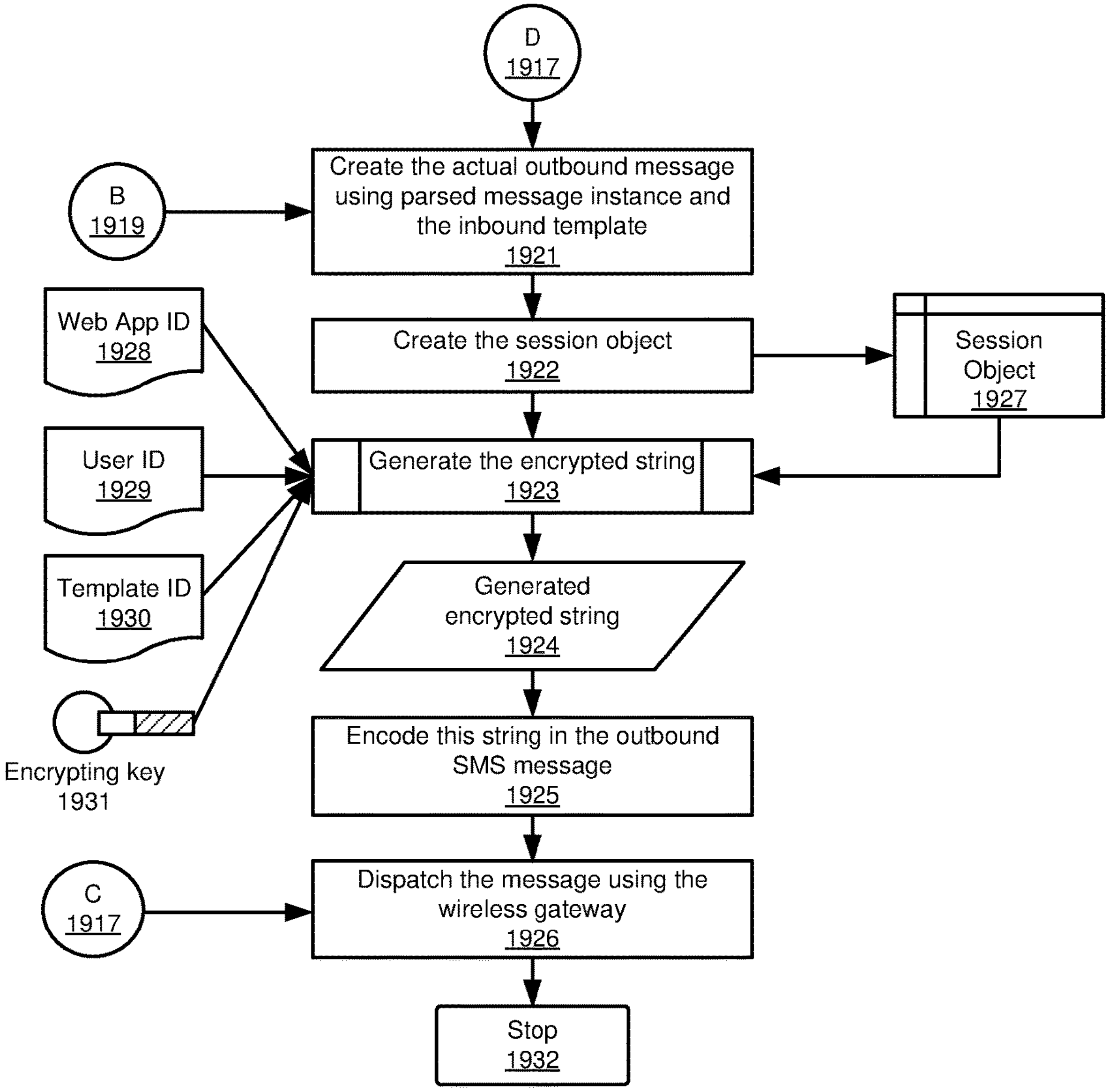
FIG. 17*c* depicts an Outbound Flow Diagram 3.

FIG. 17 depicts an outbound flow diagram of the environment of the invention. Referring to FIG. 17, it can be seen that:

- Typed SMS Message Instance 114 generated by Message Encoding Engine 111 is checked to see if it is a scheduled message.
- If it is a scheduled message to be sent later, save the message into the SMS Message Tracking DB 195. Scheduler 182 will periodically read the SMS Message Tracking DB 195 to retrieve messages which are due to send.
- If the message is due to send, it will be checked for type error by comparing to the type saved in the Universal Encoding Template 113.
- If there is a type error, generate and return error.
- If there is no type error, parse the message using the XML parser 1918 with the input of the Universal Encoding Template 113
- The XML parser 1918 parses the Typed SMS Message Instance which is in a DOM tree format 1912.
- Check to see if the message requires a response
- If response is not required, dispatch the message using the wireless gateway 103, then stop
- If response is required, extract the message template id from the parsed message.
- Find the inbound template 1916 using the message template id from Inbound Template DB 115.
- Using the Typed SMS Message Instance 114 and inbound template 1916, generate the final SMS message
- Create the session object 1927
- Using the session object, WebAppID 1928, UserID 1929, Template ID 1930 and Encoding Key 1931, generate the encrypted string 1924
- Insert the encrypted string 1924 into the final SMS message
- Dispatch the final SMS message using the wireless gateway 103, then stop.

Figure 18A:
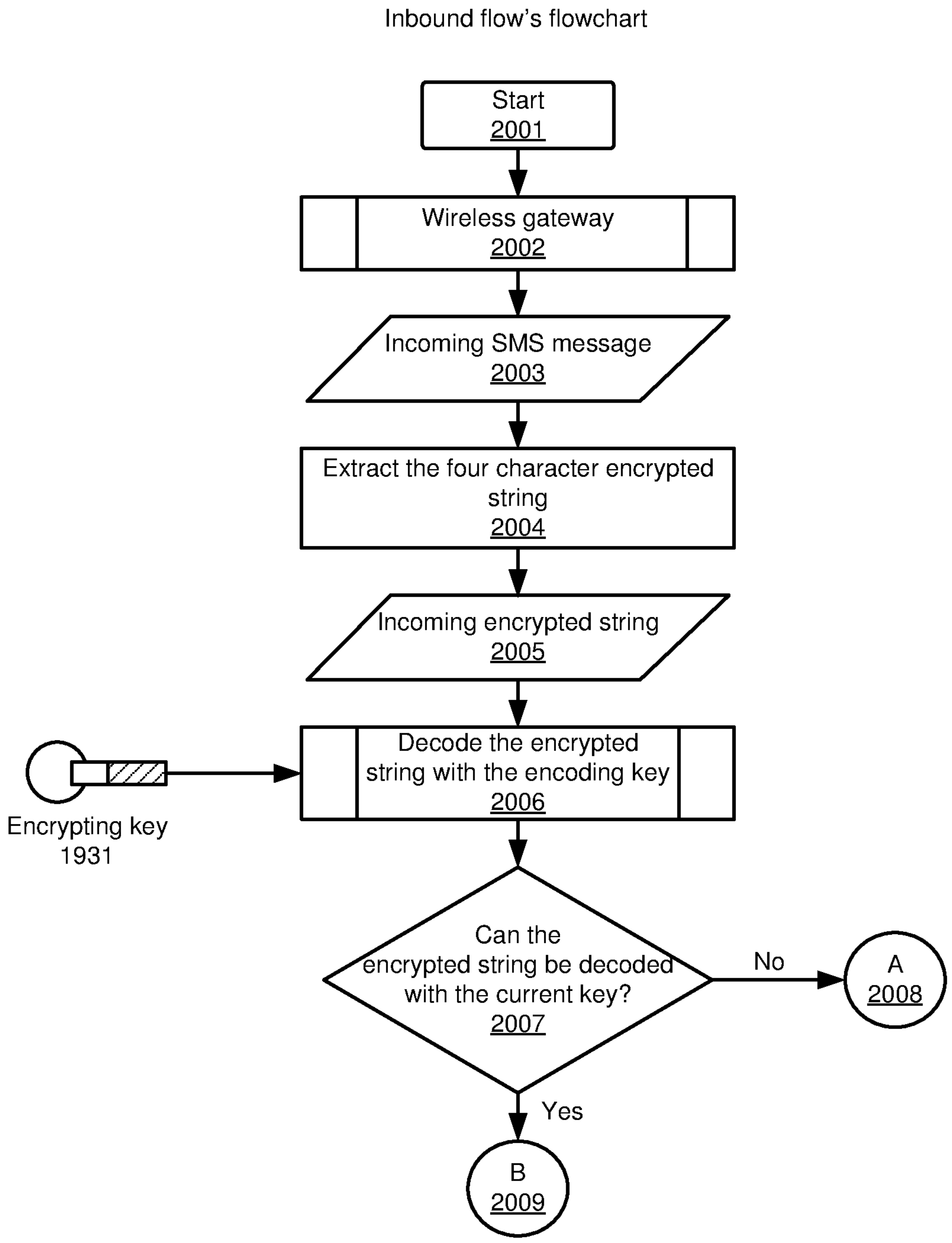
FIG. 18*a* depicts an Inbound Flow Diagram 1.
Figure 18B:
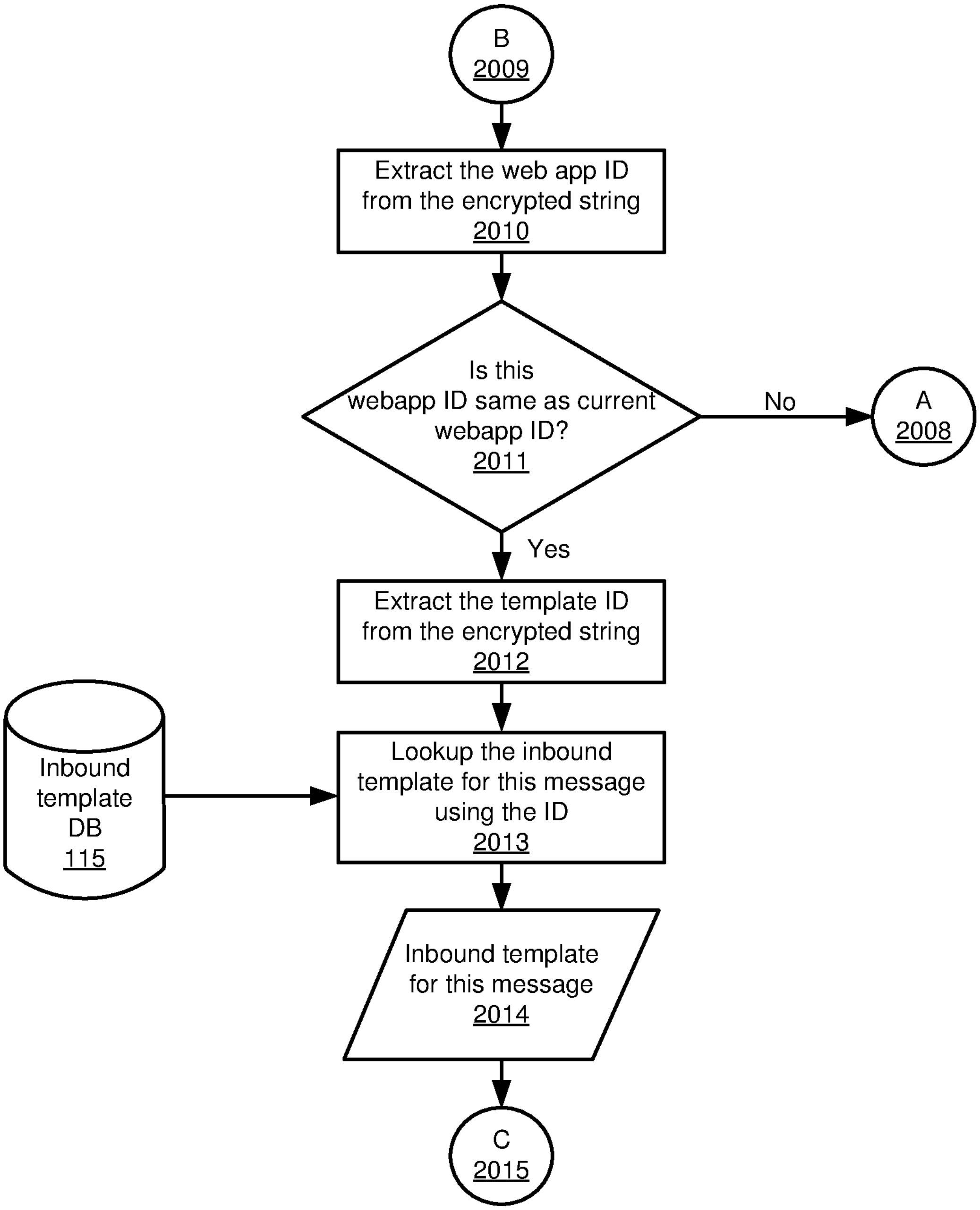
FIG. 18*b* depicts an Inbound Flow Diagram 2.
Figure 18C:
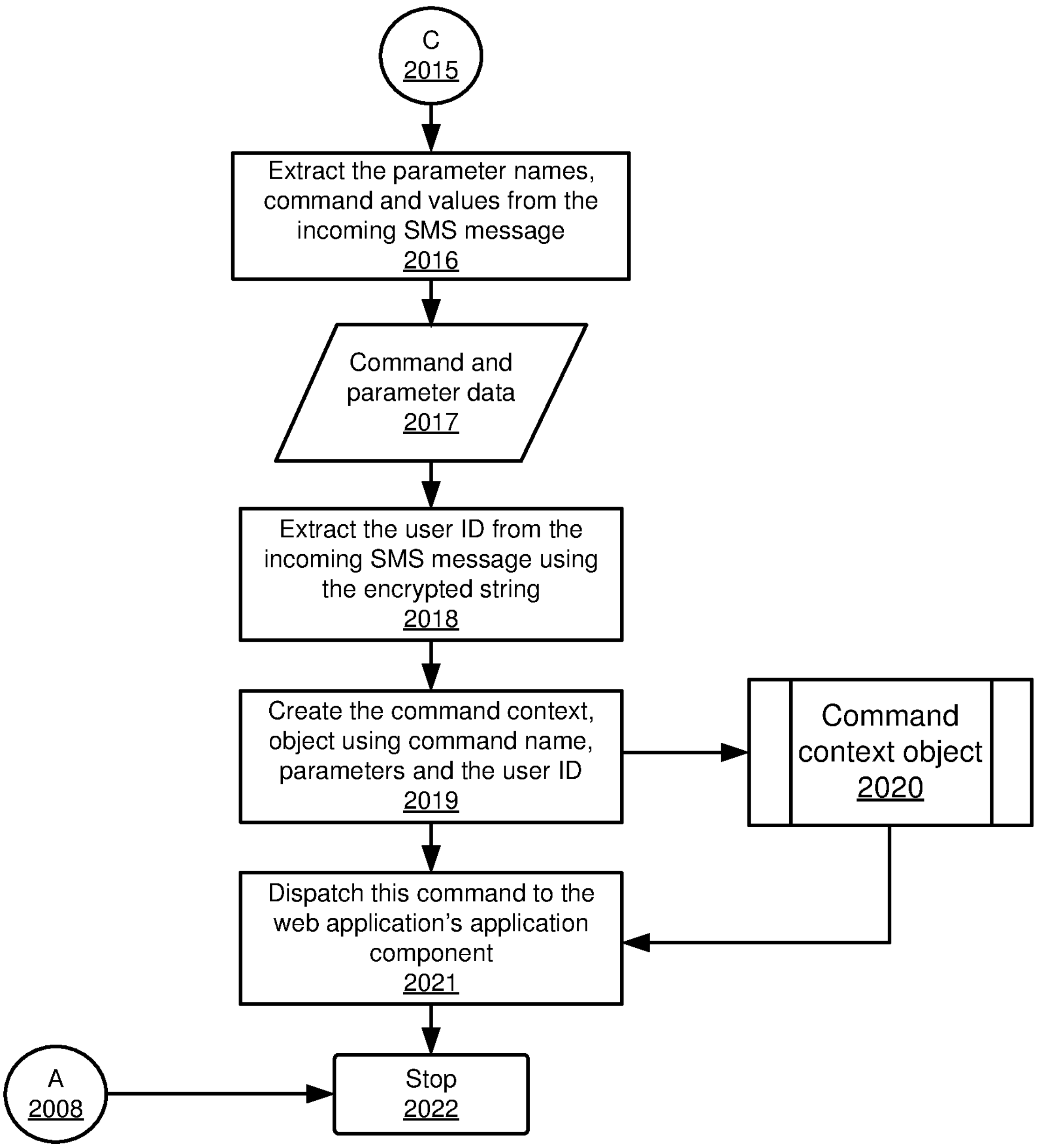
FIG. 18*c* depicts an Inbound Flow Diagram 3.

3.2 ResponseRequiredMessage and Inbound Message End To End Message Processing Flow. FIG. 18 depicts inbound flow diagram. It can be seen that:

- Wireless Gateway 103 received an Inbound SMS message 2003
- Runtime Processor 110 extracts the four character encrypted string 2005 from the Inbound SMS message 2003
- With the encoding key 1931, the encrypted string 2005 is decoded
- If decoding is not successful, then stop.
- If decoding is successful, extract the WebApp ID from the encrypted string 2005.

If the WebApp ID does not match the current WebApp ID, then stop

If the WebApp ID does match the current WebApp ID, extract the template ID from the encrypted string 2005.

Using the template ID extracted from the above, get the inbound template 2014 from the Inbound Template DB 115.

Extract the parameter names, command and values 2017 from the Inbound SMS message 2003.

Extract the User ID from the encrypted string 2005

Create the message for the Commerce Server (Command Context Object 2020) using the command name, parameters and User ID extracted above.

Dispatch the said message to the Commerce Server 108

All is completed

Figure 16:
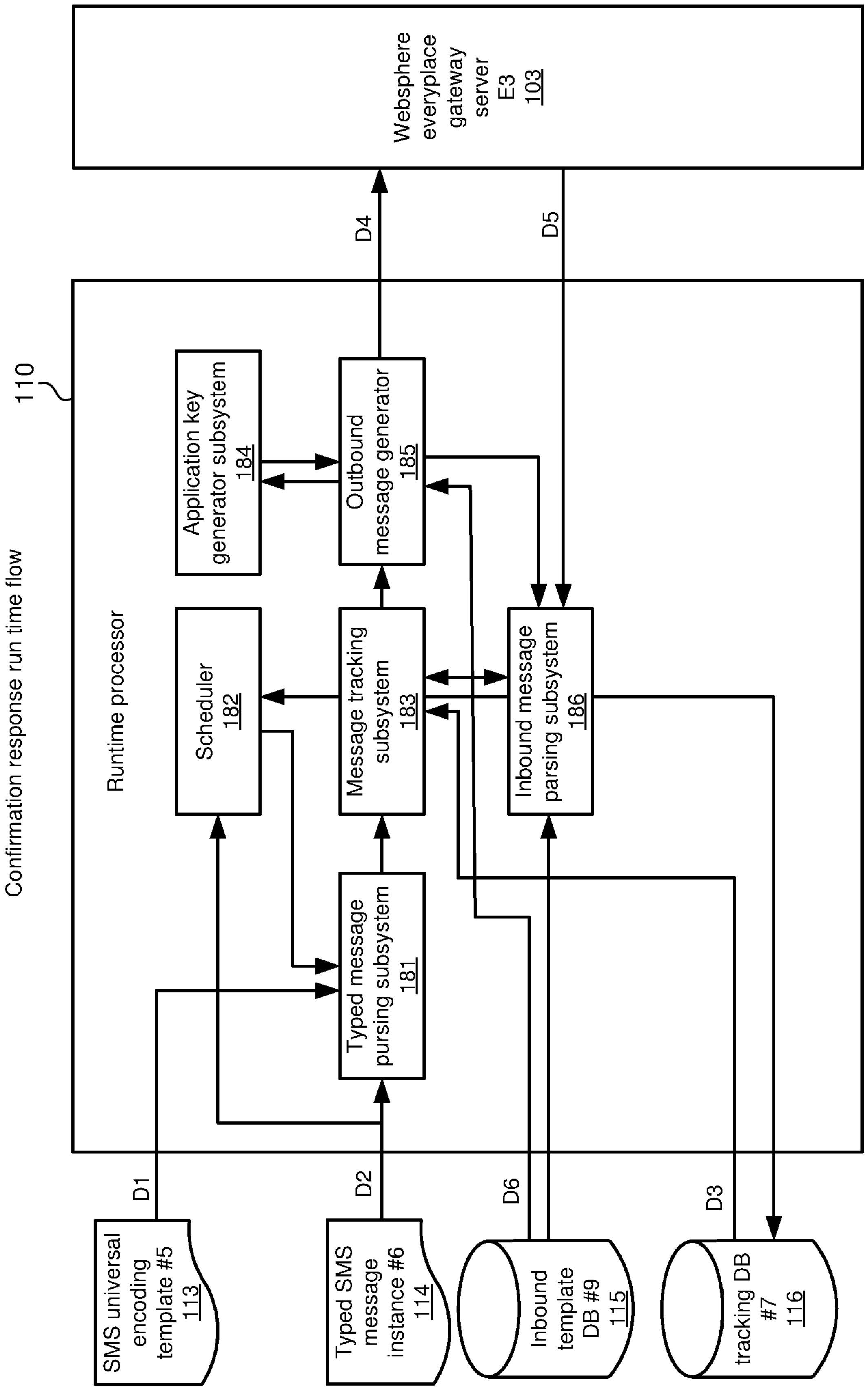
FIG. 16 depicts Confirmation Response Run Time Flow.

FIG. 16 illustrates a detailed example of the runtime processor 110 of an embodiment of the present invention depicting details sufficient for a description of the confirmation response run time processing flow. An explanation of the elements of runtime processor 110 and their interaction follows:

Typed Message Instance: The typed message instance 114, is the actual outbound SMS message as received from the Encoding Engine (or the Scheduler for a scheduled message) by the runtime. In the current implementation scheme this message is encoded in XML in accordance with the Universal Encoding Template schema.

Typed Message Parsing Subsystem: The typed message parsing subsystem 181, consists of a parser for the typed XML message. Its job is to verify that the incoming message is correctly encoded in accordance with the schema and also to parse this message into a DOM tree (for the current implementation}.

The output of this subsystem is a parsed object that contains the entire contents of the outbound SMS message in computer readable memory object format.

Message Tracking Subsystem: The message tracking subsystem 183 updates the SMS trackingDB with statistics about message sent time, message receipt time etc.

Scheduler: The scheduler subsystem 182 is responsible for timed relaying of SMS messages. If an SMS message requires to be sent at some scheduled time then this subsystem is responsible for caching the message in the message trackingDB.

Also this sub system is responsible for polling the message trackingDB at intervals decided upon by the business manager and picking up messages that are ready for dispatch and forwarding to the typed message parsing subsystem for delivery.

Application Key Generator Subsystem: The application key generator subsystem 184 is responsible for generating the encrypted string that goes out with SMS messages that require user response. This subsystem uses a system wide, time sensitive encoding/decoding key to encode this session string.

The encrypted string itself consists of the following:

1. WebAppID
2. User ID
3. Inbound TemplateID
4. Session ObjectID

As this encrypted string is based on the time sensitive encoding and decoding key, it is possible to achieve the effect of a session in SMS, which was not able to be done before.

With the notion of session being introduced in SMS now, we can now create session object which can be used for SMS based session data storage.

After the encrypted string is decoded by the time sensitive decoding key, each element (the WebApp ID, the UserID, the inbound TemplateID, and the sessionID) can be decoded at the second stage by its own corresponding decoding key (WebAppIDKey, UseridKey, inboundTemplateKey, sessionIDKey).

Thus, the final encoding is a two stage encoding scheme that can only be decoded successfully if both the system wide encoding key and the WebApp ID are correct. This leads to added security for the outbound session string.

Outbound Message Generator: The outbound message generator subsystem 185 encodes the final 160 character outbound message by using the parsed outbound SMS message generated by the typed message parsing subsystem and the session string generated by the Application Key Generator Subsystem. After creating this SMS message it forwards the message to the wireless gateway 103 for final delivery to the end user.

Inbound Message Parsing Subsystem: The inbound message parsing subsystem 186 has the task of first, decoding each incoming message using the encrypted string and the system wide encoding key and the WebApp ID. After verifying that this message can be decoded correctly, the subsystem extracts the Inbound Template ID and looks up the inbound template from the Inbound Template DB to parse the incoming message.

A successful parsing of the inbound message leads to extraction of incoming command and parameters. This subsystem then extracts the User ID from the encrypted string and creates the command context object for this incoming request. Before creating the command context object, this component also verifies the incoming PIN number for authentication using the application component 108 authentication mechanism.

The next step is to actually dispatch this message to the relevant application component.

It co-operates with the Message Tracking Subsystem to track incoming SMS messages for receipt time and other statistics.

The embodiments described herein provide a number of advantages and distinctions over prior SMS messaging systems:

1. Confirmation

The inbound template being part of the outbound SMS message text body provides a system for confirmation that would readily processable by a web application.

The SMS Response Database provides enablement of run time confirmation as required by the message type.

The absence of confirmation in previous SMS systems hinders the application of SMS in commerce. A solution to this limitation is disclosed with encrypted string such as userid and PIN, making the confirmation of a user possible.

2. Security

The inbound SMSmessage can preferably include an encrypted string with two levels of encryption. This ensures that the relevant web application only handles incoming sms messages that are directed towards that web application.

The userid is obtained by a second level userid key, together with a user specified PIN number, providing additional layers of security protection.

A 4 byte security mechanism can make sms application in commerce possible.

The two level encoding is as used herein is new as is the amalgamation of 4 elements (web app id, userid, inbound template id, session object id) into 4 bytes and decoded with two level of keys.

3. Session Control

If the Session ID is encrypted in the SMS string this will provide a timeout control for typical http sessions.

The matching of the encrypted string with the outbound message provides a request and response model, making the formation of a session possible.

With this session, cohesive requests and responses between the user and the web application are now possible, making commerce applications in SMS practical.

The 4 byte encrypted string in the message is new

The timestamp and the system key added to the encrypted string is new

The SMS response DB together with the Run Time Process to manage the session effect of request/response SMS messages at run time is new to SMS messaging.

4. Extensible Syntax: Rules for Encoding and Decoding a SMS Message

The encoded inbound message template enables the unambiguous interpretation of an inbound SMS message leading to unambiguous mapping to a selected business action of a web application of the messaging system.

This syntax is extensible to create new inbound message templates. Including the inbound message template in the outbound message so user does not need to formulate their own inbound message is new to SMS. Now the user only needs to fill in specific required parameters The extensibility of the syntax to create other syntax in new message types is new.

5.1 Extensible Semantics: Interpretation Of Encoding Mapped To Unambiguous Business Actions The predefined categorisation of the embodiments of the present invention serves as a contract between the user and the web application of the business process so that the interpretation of a given sms message is unambiguous and maps to a definite business action of a predefined business process, making commerce application of SMS possible.

The base categorisation is extensible to define new categorisation for new mapping of business actions.

The application of xml schema (with inherent characteristics including categorisation and deriving new categorisation) as a SMS Universal Encoding Template in the space of SMS is new.

5.2 Extensible Semantics: Handling of SMS Messages at Runtime in Accordance with Encoding Characteristics in Corresponding Message Types The SMS Universal Encoding Template enables extra information about the SMS messages to be shared between the Web Application and the message Run Time Processor. The Run Time Processor can now (based on the extra semantic characteristics as defined in the SMS type) perform type-appropriate run time tasks consistent with the intent of the sender (business user) as understood by the web application.

6. Enhanced Usability

Business users are now spared from the technical complexity of encoding a SMS message to match their business intents. Business user can now focus on the content of the message without being distracted by SMS message encoding.

The SMS commerce solution of this invention reduces the possibility of encoding error (as SMS encoding errors are difficult and expensive to solve at run time). The mechanism of encoding ensures error checking and provides early identification of encoding errors.

What is claimed is:

1. A method for generating a Short Message Service (SMS) business message for processing by a software application in a SMS commerce infrastructure system, the method comprising:

a server receiving, from a computer in communication with the server, a new SMS business message to be sent to a mobile recipient, wherein the business message is prepared via a graphic user interface (GUI) of the computer, wherein the GUI invokes a SMS message composing wizard (SMS MCW) for retrieving a SMS universal encoding template (SMS UET), and wherein the new business message is automatically prepared from the data entered at the GUI based on pre-defined data parameters for a selected existing type of SMS business message format;

retrieving, by a data collection interface (DCI) of the server, the data entered at the GUI of the computer to prepare the new SMS business message;

generating, by the server, a SMS message instance (SMS MI) which is categorized based on the selected existing type of SMS business message format;

transmitting, by the server, the SMS MI to a wireless gateway for delivery of the SMS MI to a mobile recipient; and receiving from the mobile recipient an incoming SMS message in response to the SMS MI that includes an inbound template identification (ID) extracted from the incoming SMS message by a runtime processor of the server.

2. The method of claim 1, further comprising:

autonomously validating, by the server, the data retrieved by the server DCI by comparing the data entered at the GUI which has been retrieved by the server, to ensure that there are no data parameter errors and to ensure that the new SMS business message is properly formatted for the selected existing type of SMS business message format.

3. The method of claim 1, further comprising:

parsing, by the server runtime processor, the incoming SMS message using an inbound template retrieved by the runtime processor from an inbound template database based on the inbound template ID extracted from the incoming SMS message to determine a decoded data, wherein the retrieved inbound template is associated with the selected existing type of SMS business message format of the SMS MI that was sent to the mobile recipient; and in response to determining the decoded data, routing, by the server, the decoded data to a software application disposed in the server for processing the decoded data under control of the software application.

4. The method of claim 1, wherein a new SMS business message type is prepared for a new SMS business message to be sent to the mobile recipient via invocation by the GUI within the SMS message composing wizard (SMS MCW) to define a format for the new SMS business message type, wherein the new SMS business message type is currently undefined by the SMS UET, and wherein a new inbound template is defined for a new incoming response SMS message from the mobile recipient which is to be associated with the new SMS business message type.

5. The method of claim 1, further comprising:

creating a new inbound template associated with the new SMS business message type to be used by the server runtime processor to parse and decode the new incoming SMS message, which is based on the new SMS business message type, received from a mobile recipient in response to the new SMS business message; and updating the existing SMS UET to include new definitions associated with the new SMS business message type and updating the inbound template database to include the new inbound template associated therewith.

6. The method of claim 1, wherein the SMS MI comprises:

a message text entry field for alerting the mobile recipient about a commerce event; and an encryption string entry field, wherein the encryption string entry field is adapted to accept at least one of security data and session identification data.

7. The method of claim 6, wherein the session identification data may be used for one or more functions comprising: associating a response to a sent message; and identifying a software application to process a response to a sent message.

8. The method of claim 1, wherein the SMS MI further comprises:

a recipient authentication data entry field which is adapted to accept a personal identification number (PIN) from the mobile recipient.

9. The method of claim 1, wherein the SMS MI further comprises:

a first recipient data entry field associated with a response indicator label, wherein the first recipient data entry field is adapted to allow a response to be inserted by a first mobile recipient; and a second recipient data entry field associated with an authentication indicator label, wherein the second recipient data entry field is adapted to allow a response to be inserted by a second mobile recipient.

10. The method of claim 1, wherein the SMS UET includes categorization meta data defining a categorization (type) of SMS business messages, wherein:

the categorization represents a specific businesses intended usage;

the categorization meta data provides a definition of the categorization; and the categorization meta data is parsable by a data processing system for generating SMS business messages.

11. The method of claim 10, wherein the SMS UET further comprises:

a message entry field for insertion of a message entry of full SMS message length (at least 160 characters) for access by the mobile recipient, wherein:

the template provides an additional field in the new SMS business message for categorization meta data; and the meta data provides instructions for encoding a business intended usage of the new SMS business message.

12. The method of claim 11, wherein the meta data includes instructions for dispatching the new SMS business message including instructions selected from: a message priority; a delivery time; a number of recipients; a delivery channel; a need for confirmation; a need for authentication; a need for encryption; and an intended web application to handle a response.

13. The method of claim 11, wherein the meta data includes instructions for identifying a software application intended to handle an incoming response from the mobile recipient to the new SMS business message.

14. The method of claim 1, further comprising:

receiving a request, from a mobile recipient, for a list of available inbound templates from a website of the business user;

in response to receiving the mobile recipient's request server retrieving the SMS UET and a list of inbound templates that is associated with the existing types of SMS business message formats, wherein the list of inbound templates is based on the existing types of SMS business message formats indicated by the SMS UET; and providing the SMS UET and the list of inbound templates to the mobile recipient;

receiving a selection, from the mobile recipient, of at least one inbound template from the list of available inbound templates.

15. The method of claim 14, further comprising:

the server sending the selected at least one inbound template to the mobile recipient user to be used by the mobile user; and receiving at least one SMS response message from the mobile user.

16. The method of claim 15, wherein the at least one SMS response message includes:

an encryption string encoded with an encoding key;

identification information of a software application capable of processing the SMS response message; and user authentication information.

17. The method of claim 16, wherein:

the server has access to the encoding key; and the server has access to the inbound template.

18. The method of claim 1, further comprising:

receiving the SMS response message sent from the mobile recipient in response to the sending of the SMS business message; and tracking in a response tracking database the received SMS response message.

19. The method of claim 18, further comprising:

identifying and parsing the received SMS response message at the server using an inbound template selected from the inbound template database; and processing the received SMS response message and forwarding the processed SMS response message to a software application within the server to invoke a command by the software application.

20. A system to generate a short message service (SMS) business message for delivery to a mobile recipient, the system comprising:

a server in communication with a computer, the server including a data collection interface to retrieve a data entered at a graphical user interface (GUI) of the computer in a new SMS business message; and program code executing on the server that causes the server to:

receive the new SMS business message from the computer to be sent to a mobile recipient, wherein the business message is prepared via a graphic user interface (GUI) of the computer, wherein the GUI invokes a SMS message composing wizard (SMS MCW) for retrieving a SMS universal encoding template (SMS UET), and wherein the new business message is automatically prepared from the data entered at the GUI based on pre-defined data parameters for a selected existing type of SMS business message format;

generate a SMS message instance (SMS MI) which is categorized based on the selected existing type of SMS business message format;

transmit the SMS MI to a wireless gateway for delivery of the SMS MI to a mobile phone of a mobile recipient, wherein the SMS MI includes an inbound template identification (ID) extracted from the incoming SMS message by a runtime processor of the server; and receive from the mobile recipient an incoming SMS message in response to the SMS MI that includes an inbound template identification (ID) extracted from the incoming SMS message by a runtime processor of the server.

21. The system of claim 20, wherein the processor further:

autonomously validates the data retrieved by the server DCI by comparing the data entered at the GUI which has been retrieved by the server, to ensure that there are no data parameter errors and to ensure that the new SMS business message is properly formatted for the selected existing type of SMS business message format.

22. The system of claim 20, wherein the server further:

parses, via the server runtime processor, the incoming SMS message using an inbound template retrieved by the runtime processor from an inbound template database based on the inbound template ID extracted from the incoming SMS message to determine a decoded data, wherein the retrieved inbound template is associated with the selected existing type of SMS business message format of the SMS MI that was sent to the mobile recipient; and in response to determining the decoded data, routes the decoded data to a software application disposed in the server for processing the decoded data under control of the software application.

23. A computer program product comprising a non-transitory computer storage medium having stored therein software code that when executed by a server computer, performs a series of method processes including:

the server computer receiving a new short message service (SMS) business message to be sent to a mobile recipient, wherein the business message is prepared via a graphic user interface (GUI) of a computer that is in communication with the server, wherein the GUI invokes a SMS message composing wizard (SMS MCW) for retrieving a SMS universal encoding template (SMS UET), and wherein the new business message is automatically prepared from the data entered at the GUI based on pre-defined data parameters for the selected existing type of SMS business message format;

retrieving, by a data collection interface (DCI) of the server computer, the data entered at the GUI of the computer to prepare the new SMS business message;

generating, by the server computer, a SMS message instance (SMS MI) which is categorized based on the selected existing type of SMS business message format;

transmitting, by the server computer, the SMS MI to a wireless gateway for delivery of the SMS MI to a mobile recipient;

sending a list of a plurality of available inbound templates for a SMS business message to a mobile recipient; and receiving from the mobile recipient an incoming SMS message in response to the SMS MI that includes an inbound template identification (ID) extracted from the incoming SMS message by a runtime processor of the server computer.

24. The computer program product of claim 23, wherein the program code further performs the method processes of: autonomously validating the data retrieved by the server DCI by comparing the data entered at the GUI which has been retrieved by the server, to ensure that there are no data parameter errors and to ensure that the new SMS business message is properly formatted for the selected existing type of SMS business message format.

25. The computer program product of claim 23, wherein the program code further performs the method processes of:

parsing, by the server computer's runtime processor, the incoming SMS message using an inbound template retrieved by the runtime processor from an inbound template database based on the inbound template ID extracted from the incoming SMS message to determine a decoded data, wherein the retrieved inbound template is associated with the selected existing type of SMS business message format of the SMS MI that was sent to the mobile recipient; and in response to determining the decoded data, routing, by the server, the decoded data to a software application disposed in the server for processing the decoded data under control of the software application.

* * * * *